(12) United States Patent
Ikegaya et al.

(10) Patent No.: US 7,918,239 B1
(45) Date of Patent: Apr. 5, 2011

(54) SHOCK ACTUATED RESPONSIVE MECHANISM FOR VERTICAL AND HORIZONTAL VALVE ASSEMBLIES

(75) Inventors: Takashi Ikegaya, Tokyo (JP); Manfred R. Hoeh, Palmdale, CA (US); Robert Eugene Bartley, Jr., Lancaster, CA (US); Carlos Escobedo, Lancaster, CA (US)

(73) Assignee: Pacific Seismic Products, Inc., Lancaster, CA (US)

( * ) Notice: Subject to any disclaimer, the term of this patent is extended or adjusted under 35 U.S.C. 154(b) by 340 days.

(21) Appl. No.: 12/012,597

(22) Filed: Feb. 4, 2008

(51) Int. Cl.
*F16K 17/36* (2006.01)
(52) U.S. Cl. .......................... 137/38; 137/556
(58) Field of Classification Search .................. 137/38, 137/556, 39
See application file for complete search history.

(56) References Cited

U.S. PATENT DOCUMENTS

| | | | | |
|---|---|---|---|---|
| 406,290 A | * | 7/1889 | Murdock | 137/38 |
| 4,185,507 A | * | 1/1980 | Domyan | 137/38 |
| 4,603,591 A | * | 8/1986 | Sibley et al. | 137/38 |
| 4,915,122 A | | 4/1990 | Ikegaya et al. | |
| 5,449,015 A | * | 9/1995 | Petkovic | 137/38 |
| 6,926,025 B1 | | 8/2005 | Sibley et al. | |

* cited by examiner

*Primary Examiner* — Kevin L Lee
(74) *Attorney, Agent, or Firm* — Thomas I. Rozsa

(57) ABSTRACT

A horizontal and vertical shock responsive fluid valve assembly which are capable of automatically closing a fluid valve in response to earthquake forces or other shock forces of a predetermined magnitude. The assemblies are comprised of a respective horizontal and vertical shock and vibration force triggering mechanism working in a similar fashion. The mechanism has a respective cradle comprising a generally concave transverse surface that holds a movable ball and when it is energized by the forces can rotate 360 degrees in any direction and rolls out of the surface such that the ball ricochets off a housing cover covering the cradle and activates the mechanism only when the external forces reach a predetermined magnitude.

11 Claims, 9 Drawing Sheets

SHOCK ACTUATED RESPONSIVE MECHANISM FOR VERTICAL AND HORIZONTAL VALVE ASSEMBLIES

BACKGROUND OF THE INVENTION

1. Field of the Invention

The present invention is related to valves and valve devices for automatically closing a valve to stop the flow of a fluid in a condition when the device is subjected to shock and vibration forces such as experienced during an earthquake. The invention is particularly related to triggering mechanisms of the valves which are actuated by earthquake movement to initiate closing of the valves.

2. Description of the Prior Art

Valves which respond to shock and vibration forces initiated by an earthquake are known, comprising various types of triggering structures which are actuated automatically to close a fluid path built inside of the valves.

U.S. Pat. No. 4,915,122 issued on Apr. 10, 1990 discloses a shock actuated valve which uses a ball motion to actuate a valve due to earthquake forces and similar shock forces. The device modifies the pedestal on which the ball rests to allow gravity forces to act on the ball once it has been moved from its position of rest to aid actuation of the shock actuation control mechanism. The modification of adding a step to the pedestal upper perimeter surface improves the accuracy for the elapsed time for the valve to be actuated once a specified force has been sensed. In prior art mechanisms the motion may be compounded by the ball not initially actuating the shock actuation control mechanism due to the ball moving, but rebounding or retreating from an initially urged position to be moved to a second position by the forces. Theses non-actuating motions of the ball delays valve closure which may increase the possibility of damage during an earthquake.

U.S. Pat. No. 6,926,025 issued on Aug. 9, 2005 discloses a vertical shock responsive fluid valve assembly which is capable of automatically closing a fluid valve in response to earthquake forces or other shock forces of a predetermined magnitude. The vertical shock responsive valve assembly has a flow control mechanism having a cradle that holds a movable ball in a recess at a point perpendicular in relation to a horizontal base plate, where the ball can be rotated 360 degrees in any direction during seismic actions or other shock forces and rolls out of its recess at a predetermined force such that it ricochets off a housing cover covering the cradle and pushes a trip fork mechanism having an elongated wall to provide additional leverage when the force strikes the trip force mechanism that is mounted on a pivoting mechanism, thereby releasing a swing arm which has a disc on the end that functions as a plug for an opening in the valve body to interrupt gas or fluid flow therein.

Therefore, there is a significant need to provide either a vertical or horizontal valve assembly actuated by the earthquake or other shock forces at a predetermined magnitude which can automatically close the respective vertical or horizontal flow of a fluid to significantly improve versatility of the devices.

SUMMARY OF THE INVENTION

The present invention includes a first embodiment of a horizontal shock and vibration force responsive valve assembly, comprising a valve housing which consists of an upper top and a lower body. Within the lower body, a first and second fluid channel are connected to a respective first and second end of the lower body. In addition, a horizontal shock and vibration force triggering mechanism is installed inside the valve housing, comprising a cradle at the bottom side affixed to a horizontal rectangular plate which is affixed to the lower body of the valve housing, a ball which serves as a shock and vibration force receiving means, a bent swing member which serves as a leverage of the triggering mechanism, and a valve stopper which serves as a cover of an interior end of the first fluid channel.

The horizontal rectangular plate having a first and second transverse end is comprised of a central slot having an opened end. The slot extends from the second transverse end to adjacent the first transverse end, and is aligned with an elongated central axis of the plate.

The cradle is comprised of an upward cylindrical interior surface which is connected to a transverse round concave surface. On the transverse surface, a central round recess is circumferentially spaced by four identical concave quadrants, with each quadrant arched by an upward angle towards the upward cylindrical interior surface. The cradle is further comprised of a transverse slot which is positioned on the bottom side to align with the central slot of the plate in the vertical orientation, in addition to an upward slot whose projection is also aligned with the plate central slot. The upward slot at the bottom end is connected to a first end of the transverse slot. Therefore, the upward slot and the transverse slot of the cradle which is combined with the central slot of the plate form a housing for the bent swing member.

The bent swing member is comprised of an upward arm which at the bottom end is connected to a transverse arm having an opened end. The swing member is rotatably positioned inside of the housing constructed by the slots. The opened end of the bent swing member is comprised of first and second identical parallel downward plates each having a respective central opening. The openings are penetrated by a transverse rod which serves as a latch pin of the latch of the horizontal triggering mechanism, wherein the rod is connected to the valve stopper.

The valve stopper is comprised of a round disc which serves as the cover of the fluid inlet channel. The disc on the top side is affixed to a connecting member having a generally "Y" shaped structure. The connecting member is comprised of a transverse rectangular section having a transverse opened end side which is connected to a first and second arm in parallel having respective opened ends. A forward extension which serves as a latch arm of the latch of the triggering mechanism, is positioned at the transverse opened end side to align with the elongated central axis of the connecting member. Therefore a space is created between the forward extension and a circumference of the round disc, wherein the transverse rod is positioned. The valve stopper at the opened ends is rotatably connected to the lower body of the assembly housing.

The present invention horizontal shock and vibration force responsive valve assembly is at a non-actuated status when the transverse rod which acts as the latch pin is positioned inside of the space of the valve stopper so that the forward extension as the latch arm of the valve stopper is locked by the latch pin of the bent swing member which is supported by the slots of the cradle. In this setting, the ball is positioned onto the central round recess of the transverse concave surface of the cradle, which is further positioned separately from the upward arm of the bent swing member. The present invention horizontal shock and vibration force responsive valve assembly is at an actuated status when the ball energized by an earthquake hits against the upward arm of the bent member to cause a rotation of the bent swing member including an upward rotating of the transverse rod to thereby release the locking condition of the latch of the triggering mechanism. Therefore, the valve rotates clockwise which results in the round disc being positioned to cover the interior end of the first fluid channel which stops the fluid flow through the assembly.

The quadrants which are particularly designed into the present invention enables the device to consume the kinetic energies of the ball energized by a small scale of the shock and vibration, where the ball is traveling one-by-one through the quadrants, so that it is unable to hit against the upward arm thereby avoiding actuation of the horizontal triggering mechanism. Therefore, the present invention horizontal shock and vibration responsive force assembly can respond to an earthquake of a predetermined magnitude.

The present invention includes a second embodiment of a vertical shock and vibration force responsive valve assembly, comprising a valve housing which is comprised of a first and second body. Within the first body which is positioned longitudinally, a first and second fluid channel are connected to a respective first and second end of the first body. A vertical shock and vibration force triggering mechanism is installed inside of the valve housing, and comprises a cradle at the left side affixed to a longitudinally positioned rectangular plate which is affixed to the first body of the valve housing, a ball which serves as a shock and vibration force receiving means, a bent swing member which serves as a leverage of the triggering mechanism, and a valve stopper which serves as a cover of an interior end of the first fluid channel.

The longitudinal rectangular plate includes a first and second transverse end which is comprised of a central downward slot having an opened end. The slot extends from the second transverse end to an end, and is further aligned with an elongated central axis of the plate.

The cradle is a seat shaped structure, comprising an upward wall having an exterior cylindrical concave surface which is connected to a transverse round concave surface of a round disc. The upward wall which is comprised of a central slot which extends downwardly to an end is connected at its left end to the longitudinally positioned plate so that the respective two downward slots are combined in an orientation to the right to form a common end. An indentation is positioned on the cylindrically concave surface of the wall adjacent but below the common end of the slot, whose projection is aligned with the central axis of the plate. A transverse spring having one end is positioned inside of the indentation and has its opposite end positioned against a left side of a downward arm of the bent swing member. In addition, a transverse slot is positioned adjacent the top of the upward wall of the cradle, which serves as a housing of a transverse axle of the bent swing member.

The bent swing member is comprised of the downward arm which at its top end is connected to the transverse section which is positioned to cross the downward slots. The transverse section has an opened end which is penetrated through an upward slot and a transverse opening. A transverse rod is installed to penetrate through the opening, which serves as a latch pin of the latch of the vertical triggering mechanism. The rod is further connected to the valve stopper when the triggering mechanism is at a non-actuated status.

The valve stopper is comprised of a round disc which serves as the cover of the fluid inlet channel. The disc on the top side is affixed to a connecting member being a generally "Y" shaped structure. The connecting member is comprised of a transverse rectangular section which includes a transverse opened end side connected to a first and second arm in parallel having respective opened ends. A forward extension which serves as a latch arm of the latch of the vertical triggering mechanism, is positioned at the transverse opened end side to align with the elongated central axis of the connecting member. Therefore a space is created between the forward extension and a circumference of the round disc, wherein the transverse rod can be positioned. The valve stopper at the opened ends is rotatably connected to the first body of the assembly housing.

The second embodiment of the present invention vertical shock and vibration force responsive valve assembly is at the non-actuated status when the transverse rod which acts as the latch pin of the bent swing member is positioned inside of the space of the valve stopper so that the upward extension as the latch arm of the longitudinally positioned valve stopper is locked by the latch pin of the bent swing member which is balanced by spring forces of the transverse spring. In this setting, the ball is positioned on the center of the transverse concave surface of the cradle, which is further positioned separately from the downward arm of the bent swing member. The present invention vertical shock and vibration force responsive valve assembly is at the actuated status when the ball energized by an earthquake hits leftward against the downward arm of the bent member to overcome the spring resisting forces. This causes a rotation of the bent swing member including an upward rotation of the transverse rod positioned at the opened end of the transverse section to thereby release the locking condition of the latch of the vertical triggering mechanism. Therefore, the valve rotates counter-clockwise which results in the round disc being positioned to cover the interior end of the first fluid channel which stops the fluid flow through the assembly.

The transverse spring, which is positioned between the upward wall of the cradle and the downward arm of the bent swing member, is particularly designed into the present invention to prevent actuation of the vertical triggering mechanism for a small scale earthquake. The downward arm which is supported by the rightward spring forces does move leftward when it is struck by the ball energized by the shock and vibration forces of the earthquake which has a small magnitude. Therefore, the present invention vertical shock and vibration responsive force assembly can respond to an earthquake of the predetermined magnitude.

It is an object of the present invention to provide a vertical shock and vibration responsive valve assembly which is adapted to automatically close off the flow of a controlled fluid in response to earthquake forces or other shock and vibration forces of a predetermined magnitude.

It is an additional object of the present invention to provide a horizontal shock and vibration force responsive valve assembly comprising a horizontal shock and vibration force triggering mechanism. The mechanism is comprised of a cradle that holds a movable ball on a concave recess of the cradle. The ball can rotatably ricochet in any direction within the cradle during seismic actions or other shock and vibration and rolls out of the recess at a predetermined force such that it hits against an upward arm of a bent swing arm which is rotatably positioned inside of slots of the cradle, which causes rotation of the bent swing member. The rotation of the bent swing member causes an upward rotation of a transverse rod as a latch pin of the bent swing member, which was previously locked by a forward extension as a latch arm of the valve stopper. Therefore, the upward rotation of the transverse arm releases the locking condition of the latch, which results in the valve stopper rotating clockwise wherein the round disc is positioned to cover an interior end of the first fluid channel so that the fluid flow is stopped.

It is a further object of the present invention to provide a horizontal shock and vibration force responsive valve assembly comprising a central concave recess circumferentially spaced by four identical concave quadrants arched by respective upward angles so that an earthquake of a small magnitude only moves the ball within each one of the quadrants to consume the kinetic energies of the ball, which assures that the ball will not hit against the upward arm of the bent swing member to thereby avoid actuation of the triggering mechanism so that the present invention horizontal shock and vibration force responsive valve assembly will only be triggered upon the occurrence of an earthquake of a predetermined magnitude.

It is also an object of the present invention to provide a vertical shock and vibration responsive valve assembly which is adapted to automatically close off the flow of a controlled fluid in response to earthquake forces or other shock and vibration forces of a predetermined magnitude.

It is an additional object of the present invention to provide the vertical shock and vibration force responsive valve assembly comprising a vertical shock and vibration force triggering mechanism. The mechanism is comprised of a cradle being a seat shaped structure including an upward wall as a seat back having an exterior cylindrical concave side which is connected to a transverse concave recess of a round disc as a seat. The cradle holds a movable ball which can rotatably ricochet in any direction during seismic actions or other shock and vibration, wherein the ball hits against a downward arm to cause rotation of a bent swing member whose transverse section rotatably crosses a downward slot of a longitudinal plate which is connected in parallel to a downward slot of the upward wall of the cradle. The rotation of the bent swing arm causes an upward rotating motion of the transverse section of the bent swing member including a transverse rod which serves as a latch pin of the latch, which was previously locked by an upward extension which serves as a latch arm of the valve stopper to thereby release the locking condition of the latch, which results in the valve stopper rotating counterclockwise rotates so that the round disc is positioned to cover an interior end of the first fluid channel so that the fluid flow is stopped through the assembly.

It is a further object of the present invention to provide a vertical shock and vibration force responsive valve assembly comprising a transverse spring which at one end is positioned to connect to the exterior concave cylindrical surface of the cradle upward wall and at the opposite end to connect to a left side of the downward arm of the bent swing member so that the ball which is energized by an earthquake having a large magnitude overcomes the spring forces to rotate the downward arm of the bent swing arm to thereby activate the triggering mechanism. Therefore, the present invention vertical shock and vibration force responsive valve assembly will be triggered upon the occurrence of an earthquake of a predetermined magnitude.

It is additional object of the present invention to provide a horizontal and vertical shock and vibration force responsive valve assembly with a simple mechanical structure for the respective triggering mechanisms so that they facilitate lower cost and better performance.

It is further object of the present invention provide a horizontal and vertical shock and vibration force responsive valve assembly with the respective improved leveraged triggering mechanisms that actuate a controlled valve entirely mechanically, to avoid the necessity for provision of an auxiliary pneumatic, electrical or other power sources, and thereby prevent problems which might be caused by failure of such power sources.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is related to a horizontal and vertical shock responsive fluid valve assemblies which are capable of automatically closing a fluid valve in response to earthquake forces or other shock forces of a predetermined magnitude. The assemblies are comprised of a respective horizontal and vertical shock and vibration force triggering mechanism working in a similar fashion. The mechanism has a respective cradle comprising a generally concave transverse surface that holds a movable ball which after it is energized by earthquake forces or other shock forces, can rotate 360 degrees in any direction and rolls out of the cradle such that the ball ricochets off a housing cover covering the cradle and activates the mechanism only when the external forces reach a predetermined magnitude through striking an arm of a leverage positioned inside of an interior space of the cradle, wherein a swing of the leverage thereby releases a latch of the mechanism which previously locked a disc so that the disc moves to cover an interior end of a fluid channel positioned inside of a housing of the assembly to interrupt and stop gas or fluid flow therein.

Referring to FIGS. 1 to 4, and 7A-B to 9, there is illustrated the present invention of a horizontal shock and vibration force responsive valve assembly 10, which is adapted to automatically close off flow of a controlled fluid such as natural gas through a conduit in response to seismic forces or other shock forces of a predetermined magnitude. The horizontal valve assembly 10 is comprised of a horizontal shock and vibration force triggering mechanism 148 which is sealed inside of a valve housing comprising a lower and upper body 100 and 134.

Figure 1:
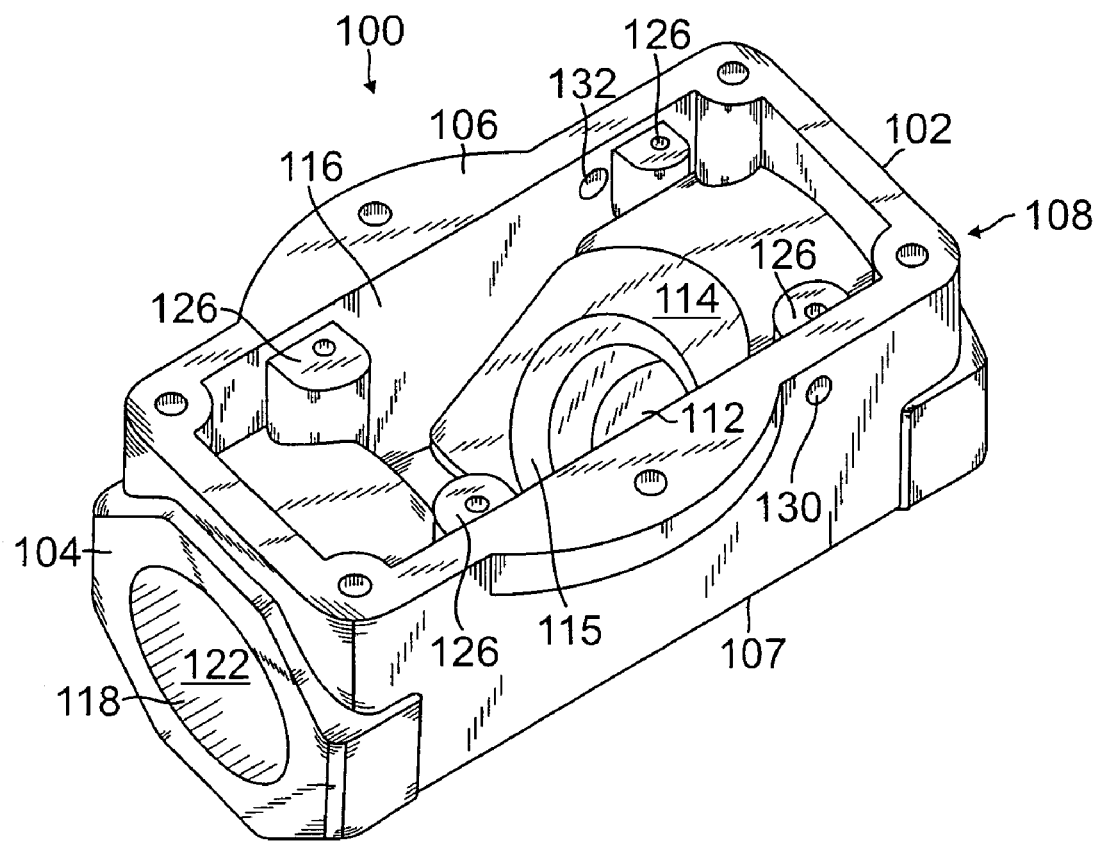
FIG. 1 is a perspective view of a lower body of a housing of the present invention horizontal shock and vibration force responsive valve assembly.

The lower body 100, as illustrated in FIG. 1, is generally an elongated rectangular box shaped structure including a first and second end side 102 and 104, a front and rear side, a top side transverse rectangular framed surface 106, and a bottom side 107. Within the lower body, there are a first and second fluid channel 108 and 118. The lower body 100 is further comprised of a plurality of upward supports 126 which are symmetrically positioned on respective interior sides of the front and rear sides. Tops of the upward supports 126 are designed lower than the top side transverse rectangular framed surface 106 for installation of the triggering mechanism 148.

On the framed surface 106, a plurality of threaded screw holes are positioned for affixing the bodies 100 and 134 together. In addition, the identical first and second axle opening 130 and 132 are positioned to penetrate through the respective front and rear side of the lower body 100 for rotatably receiving a rotatable axle, wherein the openings are positioned adjacent the first end 102 and lower than the top framed surface 106 of the lower body.

The first fluid channel 108 which includes a first and second end 110 and 112 is positioned to align with the elongated orientation of the rectangular lower body 100, wherein a part of an exterior surface of the first fluid channel 108 is merged with the interior surface of the bottom side 107. The first end 110 of the first fluid channel 108 is positioned to penetrate through the first end side 102 of the lower body 100. The second end 112 as an interior end is positioned inside of an interior chamber 116 of the lower body 100 of the valve housing. As illustrated, the second end 112 is further comprised of an outer surface 114 having a declining angle "A" which is preferably approximately 45 degrees counter-clockwise to the bottom side 107 of the lower body 100, wherein there is an additional circular seat 115 for matching a circular disc 150 of the triggering mechanism 148.

The second fluid channel 118 is also aligned with the elongated orientation of the lower body 100, comprising a first end 120 which is positioned inside of the interior chamber 116, and a second end 122 which is positioned to penetrate through the second end side 104 of the lower body 100 of the valve housing.

Figure 2:
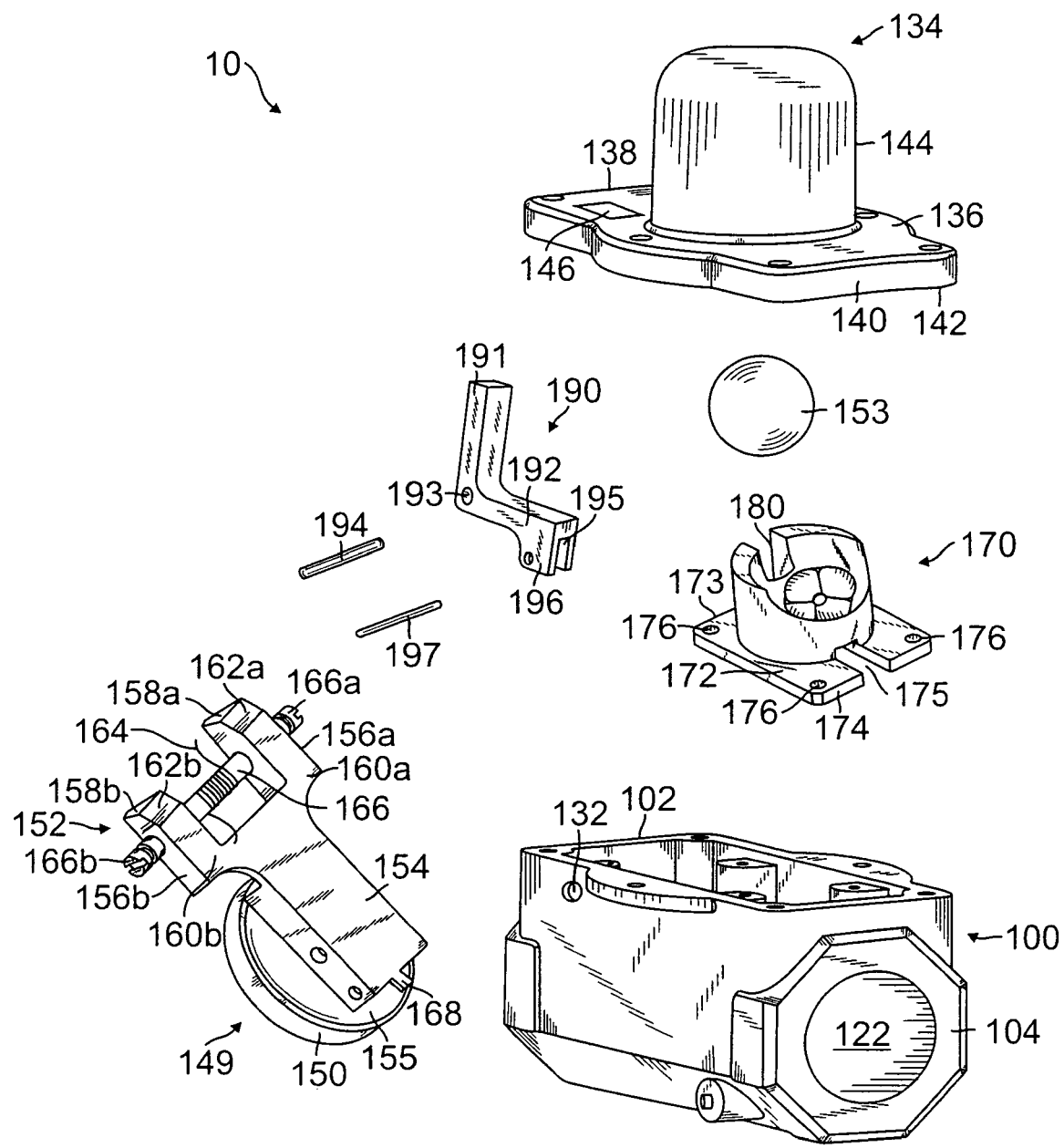
FIG. 2 is an exploded perspective view to illustrate the main components of the present invention horizontal shock and vibration force responsive valve assembly.

Referring to FIG. 2, there is illustrated the upper body 134 of the housing which acts as a top cover. The upper body is comprised of a central longitudinal cup 144 which at the lower circumference is connected to a transverse rectangular plate 136. The plate further includes a front and rear side, a first and second end side 138 and 140 which is transverse to the elongated orientation of the rectangular plate, wherein the sides defines a bottom surface 142 of the plate 136.

As further illustrated, a plurality of fastener receiving openings are positioned around the enclosed sides of the plate 136 for affixing the lower and upper body together. In addition, a transparent window 146, which can be made of a high strength glass, is positioned adjacent the first end 138 and a front side of the plate 136. It will be appreciated that a shape of the plate 136 of the upper body 134 matches the top transverse framed surface 106 of the lower body 100 of the housing. In this setting, an air-tight joint can be achieved between the bottom surface 142 and top surface 106 of the respective upper and lower body 134 and 100 of the housing after they are fastened together by fasteners, wherein an additional "O" ring is used to position between the respective surfaces.

The horizontal shock and vibration force triggering mechanism 148 of the horizontal valve assembly 10 is sealed inside of the housing which is formed from the lower and upper body. Referring to FIGS. 2 to 4, 7 and 8, there is illustrated the assembly which is comprised of a valve stopper 149, a cradle 170 which is affixed to a transverse bottom plate 172, a ball 153 as a shock and vibration force receiving means, and a bent swing member 190 which is rotatably assembled to the cradle.

The valve stopper 149 is comprised of the circular disc 150 which serves as a cover of the first fluid channel 108 to stop the fluid flow. The disc on the top surface is affixed with a connecting member 152. The connecting member is generally a "Y" or "U" shaped structure including an elongated rectangular section 154 having an opened end simultaneously connected to an identical first and second arm 156a and 156b, wherein the arms are connected to be symmetric relative to an axis which is aligned with a middle of the elongated rectangular section 154 of the connecting member 152. In addition a forward extension 168 is positioned at the opened end side and is aligned with the symmetric axis of the connecting member 152, which creates a space 155 between the forward extension 168 and the circumference of the disc 150. It will be appreciated that the forward extension 168 serves as a latch arm of a latch of the horizontal triggering mechanism.

Figure 7A:
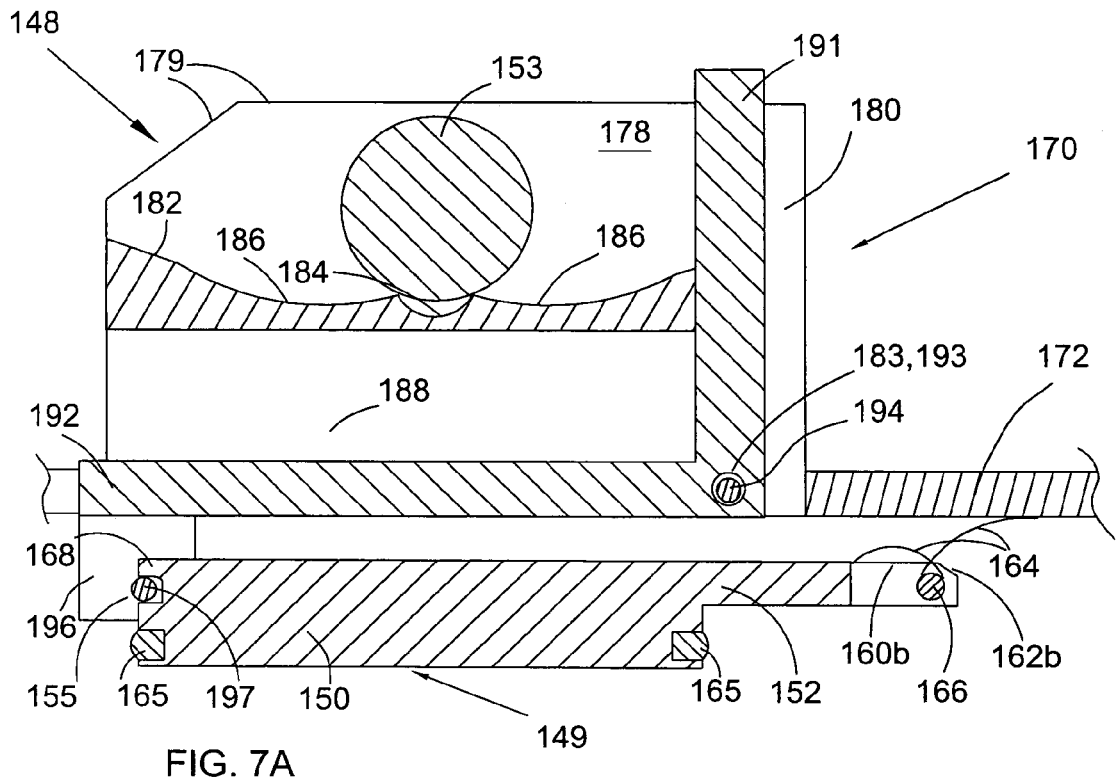
FIG. 7A is a cross-sectional view to illustrate the horizontal shock and vibration force triggering mechanism of the present invention when the triggering mechanism is not activated.
Figure 7B:
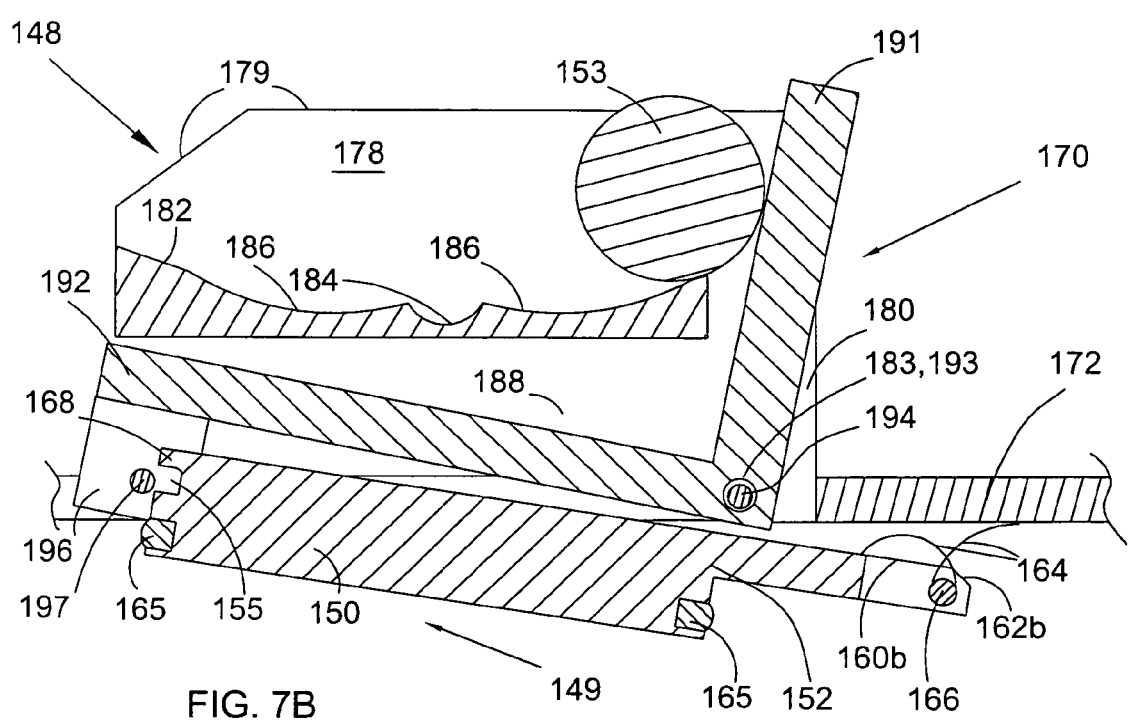
FIG. 7B is a cross-sectional view to illustrate the horizontal shock and vibration force triggering mechanism of the present invention when the triggering mechanism is activated.

As further illustrated in FIGS. 2 and 7A-7B, a top elongated transverse side 160a of the first arm 156a extends to a descending top side 162a which ends at an opened end 158a. The descending top side 162a is formed at a preferred angle of approximately 135 degrees in the clockwise direction connects to the top elongated transverse side 160a. It will be appreciated that the transverse and descending top side 160a and 162a can be painted with different colors. For example, the transverse side 160a is a green color, and the descending side 162a is a red color. In addition, an opening is positioned adjacent the opened end 158a of the first arm. The opening is orientated in parallel with the top transverse side 160a and perpendicular to the symmetric axis of the connecting member 152. Similarly, a top elongated transverse side 160b of the second arm 156b extends to a descending top side 162b, which ends at an opened end 158b, wherein two sides are painted in the different color. In addition, an opening is positioned adjacent the opened end 158b, which is orientated in parallel with the top side 160b and perpendicular to the symmetric axis of the connecting member 152.

A transverse axle 166 having the first and second end penetrates through the openings of the respective first and second arm 156a and 156b, and further penetrates through a spring 164 which is positioned between two arms of the valve stopper, wherein one end of the spring is placed on the top of the rectangular section 154.

It will be appreciated that the valve stopper 149 is rotatable around an axis aligned with the openings 130 and 132 of the lower body, after the valve stopper 149 is assembled to the lower body 100 by connecting the transverse axle 166 to the respective first and second axle opening 130 and 132 of the lower body. As further illustrated, a first narrow slot 166a is positioned at the first end of the axle 166, which is transverse to an elongated direction of the axle. Similarly, a second narrow slot 166b is positioned at the second end of the axle. Therefore, the valve stopper 149 rotates as the axle 166 rotates which is driven by a rotating force applied to one of the respective slots, such as the force of a screw drive.

Referring to FIGS. 2 to 4, and 7A-7B, there is illustrated cradle 170, which at the bottom side is connected at a center of the transverse bottom plate 172. The bottom plate 172 is generally rectangular including a first and second end side 173 and 174. Within the plate, there is a central slot 175 which is aligned with a central axis of the plate 172. The slot includes an opened end which is positioned on the plate second end side 174. In addition, four openings 176 are placed onto the respective each corner of the plate for affixing the cradle 170 to the lower body 100 of the housing.

The cradle 170 is generally cylindrical, comprising a circular wall 177 having an interior upward cylindrical surface 178. A generally concave transverse interior side 182 is positioned to connect to the interior upward surface 178 of the wall, which creates an interior room of the cradle. The upward wall 177 includes a top side 179 with an uneven height. The top side 179 of the wall 177 is higher adjacent the first end side 173 of the bottom plate 172, as compared with a lower height adjacent the plate second end side 174.

In addition, an upward slot 180 extends through the wall 177, whose projection is positioned on the central symmetric axis and adjacent the first end side 173 of the bottom plate 172. Therefore, the slot 180 creates a short transverse opened side 181 on the interior transverse concave side 182 of the cradle 170. The upward slot 180 at its bottom end is further connected to a transverse slot 188. The transverse slot 188 which is positioned on the bottom side of the cradle 170 is aligned with the central slot 175 of the bottom plate 172 in the vertical orientation. Therefore, the upward slot 180 combined with the bottom transverse slot 188 of the cradle 170 which is further combined with the central transverse slot 175 of the bottom plate 172 constructs a housing for the bent swing member 190.

As illustrated in FIGS. 7A-7B, the cradle 170 further includes a transverse opening 183 which is parallel with the bottom plate 172 and transverse to the bottom transverse slot 188. The opening 183 which penetrates through the cradle is aligned with a center of an area where the upward slot 180 connects to the transverse slot 188.

Figure 3:
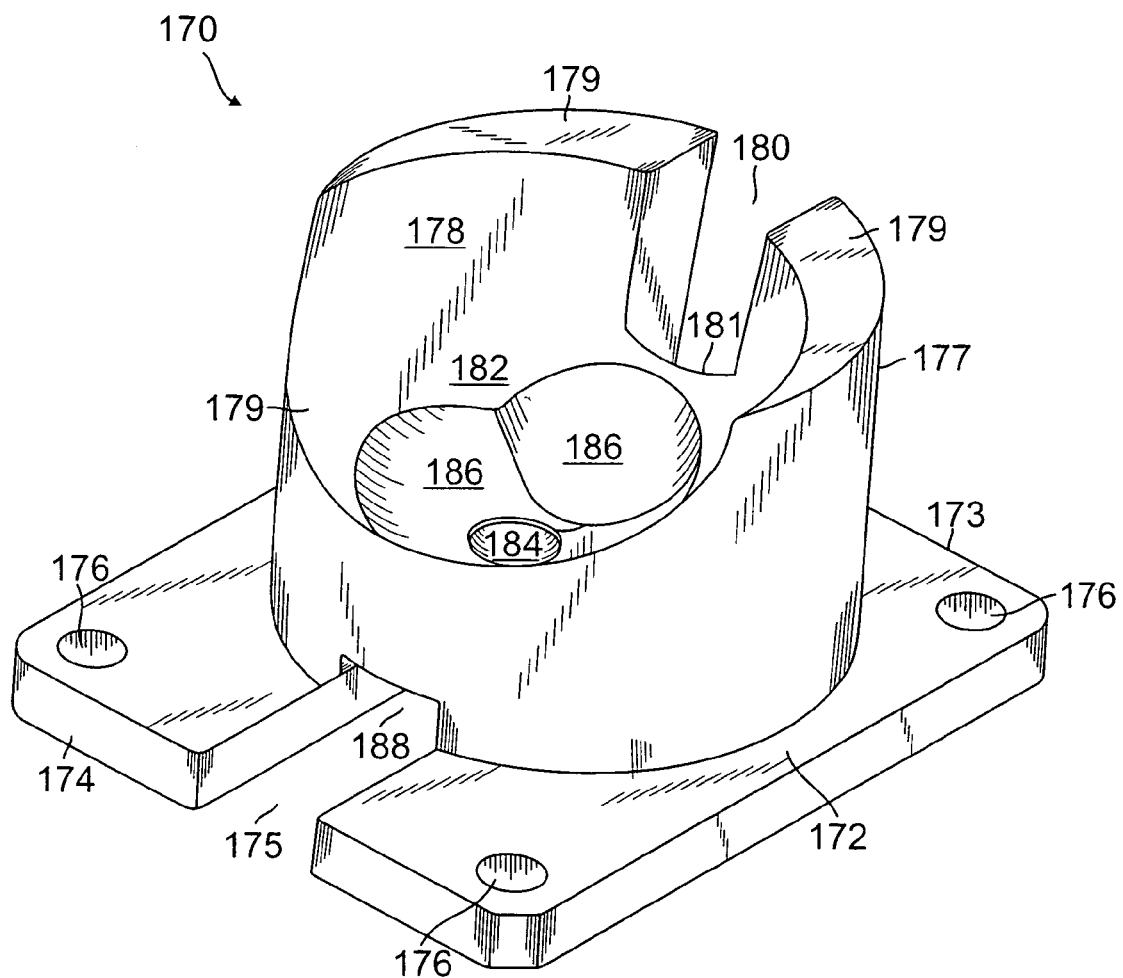
FIG. 3 is a perspective view to illustrate a first embodiment of a cradle of the horizontal shock and vibration force responsive valve assembly, comprising four quadrants which are positioned on a transverse round concave surface of the cradle, wherein a joint of the first and fourth quadrant which is aligned with a joint of the second and third quadrant is transversely aligned with an upward slot of the cradle.
Figure 4:
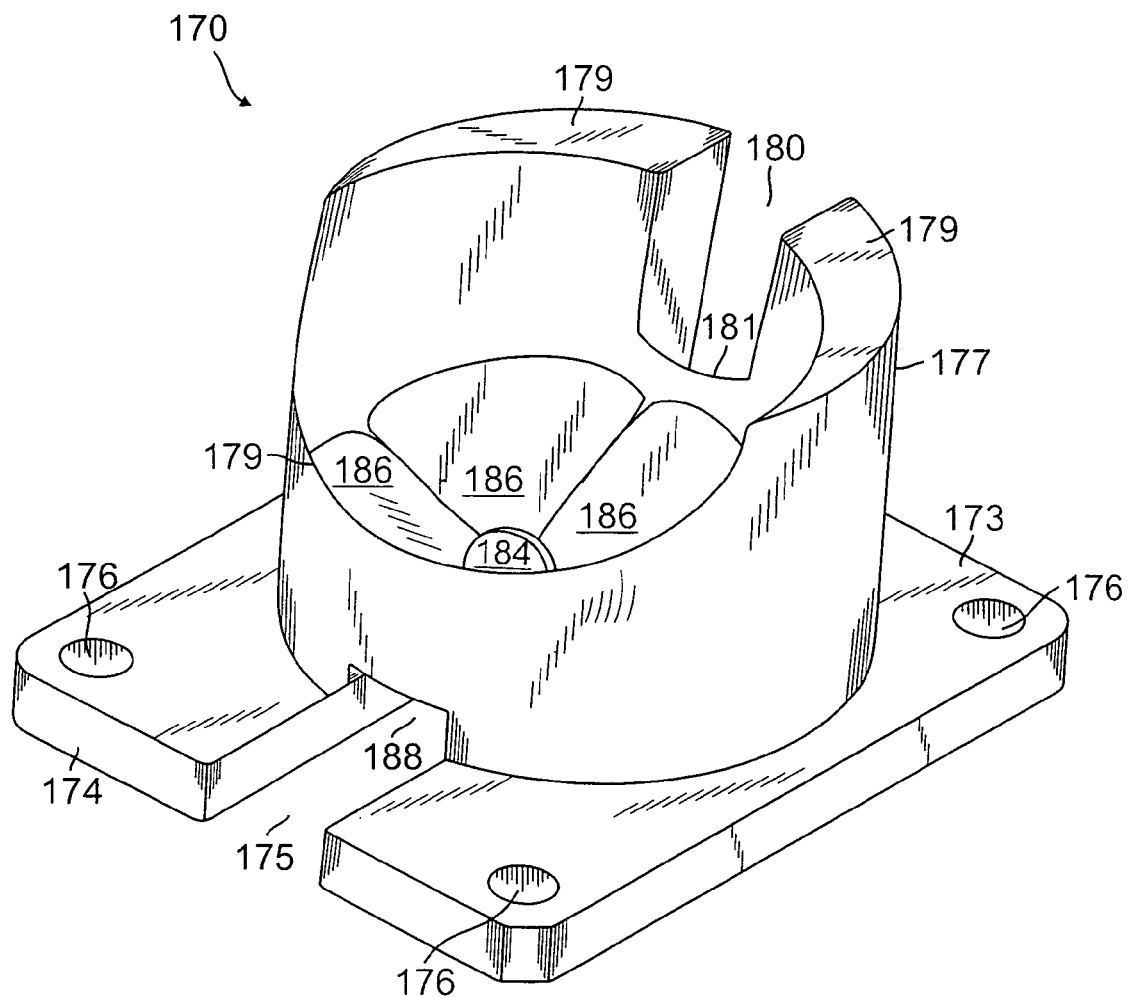
FIG. 4 is a perspective view to illustrate a second embodiment of the cradle of the horizontal shock and vibration force responsive valve assembly, comprising four quadrants which are positioned on a transverse round concave surface of the cradle, wherein a central axis of the first and third quadrant is transversely aligned with the upward slot of the cradle.

Referring specifically to FIGS. 3 and 4, there is illustrated the structural character of the transverse interior concave side 182, comprising a central circular concave recess 184 which is respectively circumferentially spaced by three or four identical concave quadrants 186. The central recess 184 is positioned at the center of the interior transverse concave side 182, which is the lowest physical position of the side. Each identical quadrant 186 is arched by an angle, preferably between 20 and 30 degrees which extends ascending from the central recess 184 towards the upward interior surface 178.

Comparing orientation of the quadrants 186, FIG. 3 illustrates a first embodiment of the present invention to position the quadrants which include three quadrants, wherein an orientation of a joint between the first and second quadrant, which is aligned with an orientation of a joint between the third and fourth quadrant, is perpendicular to the orientation of the upward slot 180 and is further aligned with the central symmetric axis of the bottom plate 172 in the vertical direction. In contrast to the first embodiment, FIG. 4 discloses a second embodiment to position the quadrants which includes four quadrants where a central axis of the respective first and third quadrant is transverse to the upward slot 180 and is further aligned with the central symmetric axis of the bottom plate 172 in the vertical direction.

The bent swing member 190, as illustrated in FIGS. 2, 7A-7B and 8, rotatably connects to the cradle 170. The member 190 is comprised of a first upward arm 191 having an opened end. The upward arm at its opposite end is connected to a second transverse arm 192 at an angle, preferably 90 degrees. An opening 193 is positioned at the joint of the first and second arm 191 and 192. The second transverse arm 192 at the opposite opened end is simultaneously comprised of an identical first and second downward plate 195 and 196 which are parallel to each other. In addition, each plate has a central opening. As illustrated, a transverse rod 197, which is connected to the openings of the respective plates 195 and 196, serves as a latch pin of the latch of the horizontal triggering mechanism 148.

In addition, as illustrated in FIGS. 2, 7A-7B and 8, after the bent swing member 190 is positioned into the housing constructed by the slots 170, 180 and 188, an axle 194 penetrates through the transverse opening 183 of the cradle 170 and the opening 193 of the bent swing member 190. Therefore, the swing member 190 having the first upward arm 191 and second transverse arm 192 can rotate around the axle 194 within the housing of two slots.

However, it will be appreciated that the swing movement of the member 190 is limited when the first upward arm 191 is rotatably moving towards the second end side 174 of the bottom plate 172, since a maximum movement of the upward arm 191 is restricted by the position of the short transverse side 181 of the cradle 170, which applies a force to the first upward arm 191 for resisting a further movement of the arm. In this setting, the bent member 190 serves as a leverage wherein the first upward arm 191 is a first leverage arm and the second transverse arm 192 is a second leverage arm. Therefore, the force applied to the upward arm 191 balances a force applied to the second transverse arm 192, such as the weight of the second transverse arm 192. It will be further appreciated that additional forces can be applied to the second arm 192 in a situation illustrated in FIG. 7.

Figure 8:
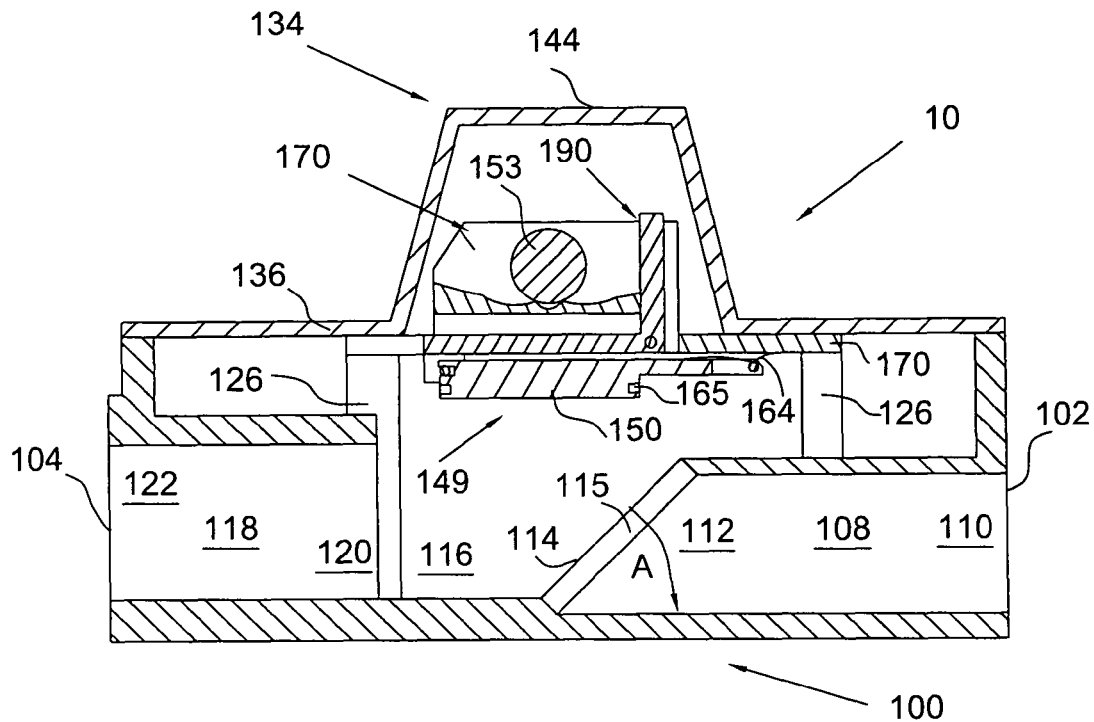
FIG. 8 is a cross-sectional view of the present invention horizontal shock and vibration force responsive valve assembly, wherein a horizontal shock and vibration force triggering mechanism is illustrated at the non-actuated status to thereby allow a fluid flow through the valve assembly.

Referring to FIGS. 7A-7B and 8, there is illustrated the horizontal shock and vibration force triggering mechanism 148 is installed into the lower body 100 of the housing, wherein the bottom transverse plate 172 of the mechanism 148 is fastened to the tops of the upward supports 126 of the lower body 100. The valve stopper 149 is installed into the lower body 100. Therefore, one end of the spring 164 is placed on the top of the rectangular section 154 of the connecting member 152, and the opposite end of the spring is positioned behind the bottom plate 172. In addition, the forward extension 168 of the stopper 149 is attached to the transverse rod 197 so that the rod occupies the space 155 of the valve stopper 149, wherein the extension 168 and the rod 197 serve as the respective latch arm and pin of the latch. In this setting where the latch is in the locking condition, a downward force of the spring 164 and a weight of the valve stopper 149 in addition to the weight of the second transverse arm 192 are applied to the transverse rod 197 of the bent swing member. However, due to a rigidity of the mechanical structure of the respective swing member 190 and cradle 170, a balance of the leverage is still achieved so that the bent swing member 190 holds the valve stopper 149 which is transversely positioned inside of the lower body 100.

The horizontal shock and vibration force responsive valve assembly 10 is completely assembled after affixing the upper body 134 to the lower body 100 of the valve housing in an air tight fashion.

Referring to FIGS. 7A-7B 8 and 9, there is illustrated how the present invention horizontal shock and vibration force responsive valve assembly 10 appropriately responds to a shock and vibration movement generated by earthquake to close a flow of a fluid such as a natural gas flow for safety. As illustrated in FIG. 8, the assembly 10 is at the non-actuated state, wherein the valve stopper 149 is locked by the bent swing member 190, which results in the first fluid channel 108 being open so that a fluid can flow from the first end 110 of the first fluid channel 108 to the second end 122 of the second fluid channel 118, wherein the first and second fluid channels 108 and 118 are connected to the respective fluid conduits.

It will be appreciated that, through the transparent window 146 of the upper body 134, the green color of the top transverse side 160a of the first transverse elongated member 156a is visible, wherein the visible green color indicates the non actuated status of the present horizontal invention shock and vibration force responsive valve assembly 10.

As illustrated, according to the non-actuated status, the ball 153 which serves as the shock and vibration force receiving means is spontaneously positioned on the central circular recess 184 of the interior transverse concave surface 182 surrounded by the upward circular surface 178 of the wall 177, wherein the central circular recess 184 is at the lowest position of the interior surface 182. Therefore, the ball 153, which is positioned physically stable, is away from the first upward arm 191 of the bent swing member 190.

However, during earthquake, a shock and vibrational force of the earthquake causes movement of the ball 153. It will be appreciated that, the horizontal triggering mechanism 148 of the present invention is designed in such way that the ball 153 in movement will not get stuck since the ball 153 is only restricted to move within the interior room of the cradle 170. Therefore, the ball will always ricochet back towards the center after it ricochets away from the central circular recess 184 of the interior concave side 182.

Therefore, the movement of the ball 153 permits it to hit against the upward arm 191 to thereby cause an outward rotating movement of the first upward arm 191, which activates the triggering mechanism 148 as illustrated in FIGS. 7B and 8. The outward rotating movement of the first upward arm 191 causes an upward rotating movement of the second transverse arm 192 including the transverse rod 197. This results in releasing the locking condition of the latch constructed by the forward extension 168 of the valve stopper 149 and the transverse rod 197 of the bent swing member 190.

Figure 9:
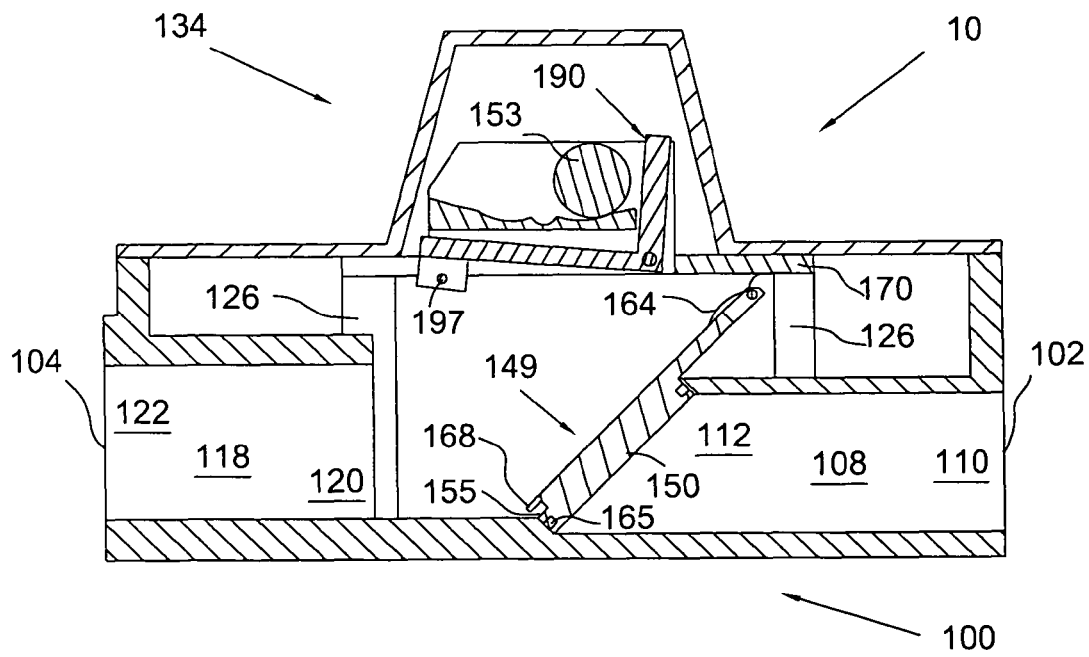
FIG. 9 is a cross-sectional view of the present invention horizontal shock and vibration force responsive valve assembly, where the horizontal shock and vibration force triggering mechanism is at the actuated status to thereby close the fluid flow after responding to the shock and vibration forces of a predetermined magnitude.

Referring to FIG. 9, after being released from the locking condition, the valve stopper 149 which is applied by the force of the spring 164 and the force of the weight rotates, preferably at an angle of approximately 45 degrees in the counterclockwise direction, to position into the annular seat 115 of the second end 112 of the first fluid channel 108, wherein the size of the annular seat 115 matches the round disc 150 of the valve stopper 149. Furthermore, the round disc 150 of the valve stopper 149 remains inside of the seat 115, since it is consistently under the spring forces in the counterclockwise direction to thereby balance forces of the fluid under a supplied pressure. Therefore, the round disc 150 closes the first fluid channel 108 so that a flow of the fluid such as a natural gas flow is stopped. It will be appreciated that an "O" ring 165 can be a part of the round disc 150, which is positioned on the circumference of the round disc 150 for achieving an air tight seal. In this situation, it will be appreciated that, through the transparent window 146, the red color of the descending side 162a of the valve stopper 149 is visible after the stopper rotates, wherein appearance of the red color indicates the actuated status of the valve assembly 10.

It will be appreciated that a specific object of the present invention to add three or four quadrants 186 onto the transverse interior side 182 of the cradle 170 is to prevent unnecessary activation of the triggering mechanism 148 which can stop the fluid flow during a weak earthquake whose shock and vibration in small magnitudes does not cause a safety concern. In such situation when the weak earthquake happens, it moves the ball 153 respectively at last some, and possibly all, of the quadrants 186 to follow the arched degrees, such as 20 to 30 degrees in the upward orientation. The upward moment of the ball 153 consumes the kinetic energy of the ball so that it prevents the ball 153 from hitting against the upward arm 191 of the bent swing arm 190 to thereby avoid activation of the horizontal triggering mechanism 148. With addition of the quadrants, it will be appreciated that the triggering mechanism 148 of the present invention valve assembly 10 will not be activated if an earthquake happens which frequencies are under 0.15 giga Hertz.

The present invention valve assembly 10 can be deactivated after being activated, where the rotatable axle 194 is turned in the clockwise direction by an external force such as the force of a screw drive till the forward extension 168 of the valve stopper 149 attaches the transverse rod 197 of the bent swing member 190, so that the rod 197 re-occupies the space 155 of the valve stopper 149 to return to the locking condition of the latch. In this setting, the green color of the top transverse elongated side 160a of the valve stopper is visible to indicate completion of the deactivation of the valve assembly 10.

The above disclosure illustrates one embodiment of the present invention horizontal valve assembly 10. However, various embodiments are readily available with variations of structural components. For example, in another embodiment, the spring 164 which is positioned between the first and second arm 156a and 156b as illustrated in FIG. 2 can be eliminated. According to this structural variation, the fluid flow can be arranged in a direction which is from the second end 122 of the second fluid channel 118 to the first end 102 of the first fluid channel 108. Therefore, the flow direction is in reverse, as compared with the above disclosed one.

The embodiment works in such way, as soon as the locking status is released, a force of the fluid flow will push the valve stopper 149 which is rotated in the counter-clockwise direction to speed up to the seat 115 of the first fluid channel 108.

The round disc 150 of the valve stopper will remain inside of the seat in the air-tight fashion when the valve stopper 149 is continuously under the forces of the fluid, so that the flow of the fluid through the assembly is stopped.

An advantage of eliminating the spring 164 and reversing the fluid flow direction is a reduction of the structural element in addition to ease of deactivating the assembly 10 after the horizontal mechanism is activated.

In addition, the bent swing member 190 can be any appropriate form of the leverage, where a first arm of the leverage can be struck by the ball 153 as the shock and vibration force receiving means, and a second arm of the leverage contains a latch member, which can be locked or released by another latch member of the valve stopper 149. The valve stopper can be comprised of a stopper, instead of the specific round disc 150, to close the interior end 112 of the first fluid channel 108. The cradle 170 is not limited having the circular cylindrical wall 177. Instead, it can be comprised of an upward wall as long as the upward slot 180 can be positioned, since the ball is always surrounded by the central upward cup 144 of the upper body 134 of the assembly housing so that the movement of the ball will be restricted within an interior of the cup. In general, the cradle can be in any form as long as it can receive the ball. As to the ball 153, it can be replaced with a weighed object which is rotatable and movable. Therefore, under an excitation of the earthquake the weighted object will strike the leverage to cause it to close off flow of the fluid.

Now referring to FIGS. 5, 6, 10 and 11, there is illustrated the present invention of a vertical shock and vibration force responsive valve assembly 20, which is adapted to automatically close off the flow of a controlled fluid such as a natural gas through a conduit in response to seismic forces or other shock forces of a predetermined magnitude. The vertical valve assembly 20 is comprised of a vertical shock and vibration force triggering mechanism 248 which is sealed inside of a valve housing comprising a first and second body 200 and 234.

Figure 5:
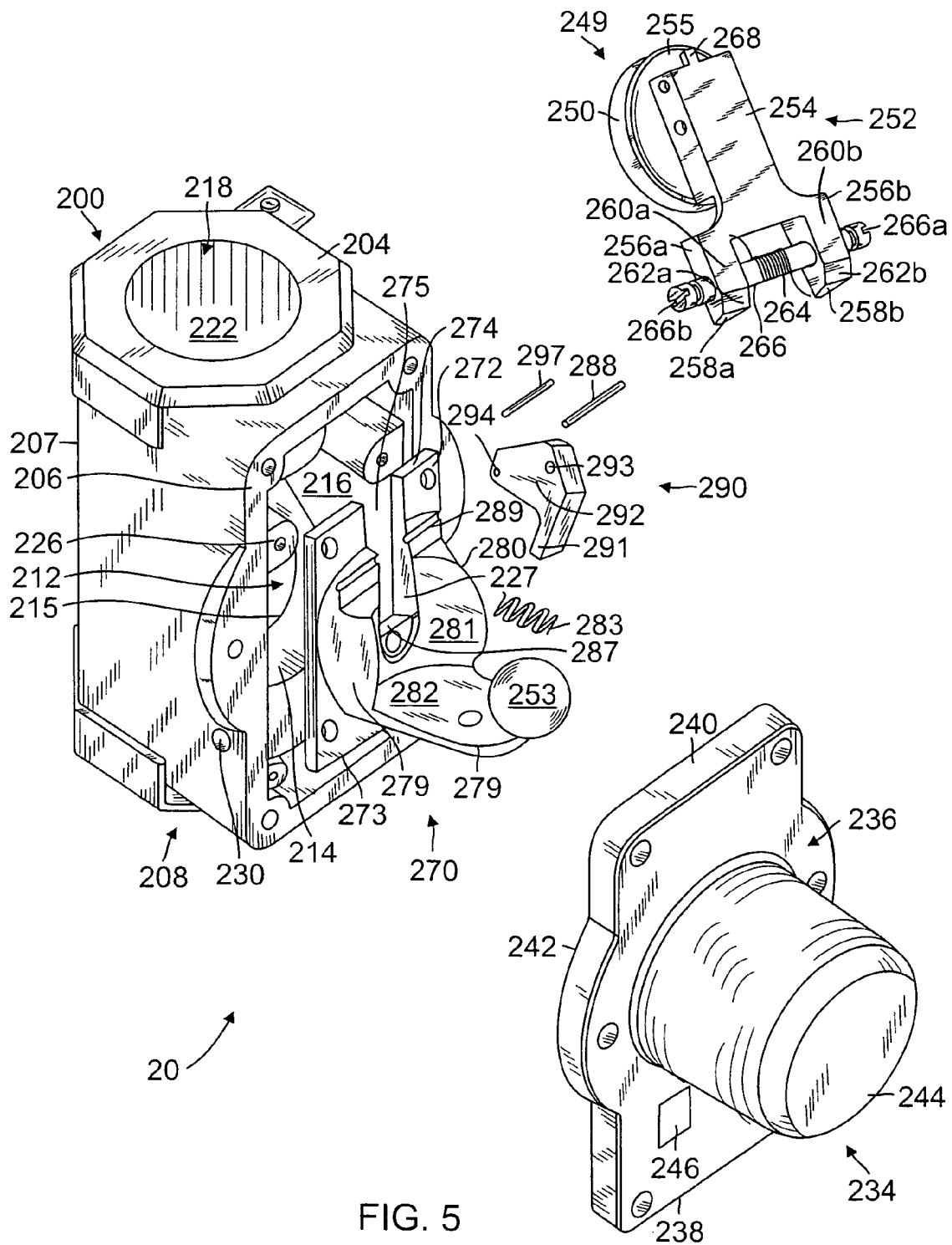
FIG. 5 is an exploded perspective view to illustrate main components of the present invention vertical shock and vibration force responsive valve assembly.

The first body 200, as illustrated in FIG. 5, is identical in structure to the lower body 100 illustrated in FIG. 1, but is positioned in a vertical orientation. Therefore, the first body 200 is also generally an elongated rectangular box including a first and second end 202 and 204, a front and rear side, a right side transverse rectangular framed surface 206, and a left side 207. Within the first body, there are a first and second fluid channel 208 and 218. The first body 200 inside is further comprised of a plurality of rightward supports 226 which are symmetrically positioned on respective interior sides of the front and rear side. In addition, a right side end of each rightward support 226 is designed less rightward than the right side transverse rectangular framed surface 206 which is positioned for affixation of the vertical triggering mechanism 248.

On the framed surface 206, a plurality of threaded screw holes are positioned for affixing the first and second body 200 and 234 together. In addition, an identical first and second axle opening 230 and 232 are positioned to penetrate through the respective front and rear side of the first body 200 for rotatably receiving a rotatable axle, wherein the axle openings are positioned adjacent the first end 202 and less rightward than the right side framed surface 206 of the first body.

The first fluid channel 208 which includes a first end and second end 210 and 212 is positioned to align with the elongated longitudinal orientation of the rectangular first body 200, wherein a part of an exterior surface of the inlet channel 208 is merged with the interior surface of the left side 207. The first end 210 of the inlet channel 208 is positioned to penetrate through the first end 202 of the first body 200. The second end 212 as an interior end of the first fluid channel 208 is positioned inside of an interior chamber 216 of the first body 200 of the valve housing. As illustrated, the second end 212 is further comprised of an outer surface 214 having a declining angle "A", preferably about 45 degrees clockwise to the left side 207 of the first body 200, wherein there is an additional circular seat 215 for matching a circular disc 250 of the triggering mechanism 248.

The second fluid channel 218 is also aligned with the elongated orientation of the first body 200, comprising a first end 220 which is positioned inside of the interior chamber 216, and a second end 222 which is positioned to penetrate through the second end 204 of the first body 200 of the valve housing.

Referring to FIG. 5, there is illustrated the second body 234 of the housing such as a right side cover. The second body is comprised of a central transverse rightward cup 244 which at the left side circumference is connected to a longitudinal rectangular plate 236. The plate is further included a front and rear side, a first and second end side 238 and 240 which are transverse to the elongated orientation of the rectangular plate, wherein all the sides define a left side surface 242 of the plate.

As further illustrated, a plurality of fastener receiving openings are positioned around the enclosed sides of the plate 236 for affixing the first and second body together. In addition, a rectangular transparent window 246, which is preferably made of high strength glass, is positioned longitudinally adjacent the first end 238 and a front side of the plate 236. It will be appreciated that the shape of the plate 236 of the second body 234 matches the rightward longitudinal framed surface 206 of the first body 200 of the housing. In this setting, an air-tight joint can be achieved between the leftward surface 242 and rightward surface 206 of the respective second and first body 234 and 200 of the housing after they are fastened by fasteners, wherein an additional "O" ring is used to position between the respective surfaces.

Figure 6:
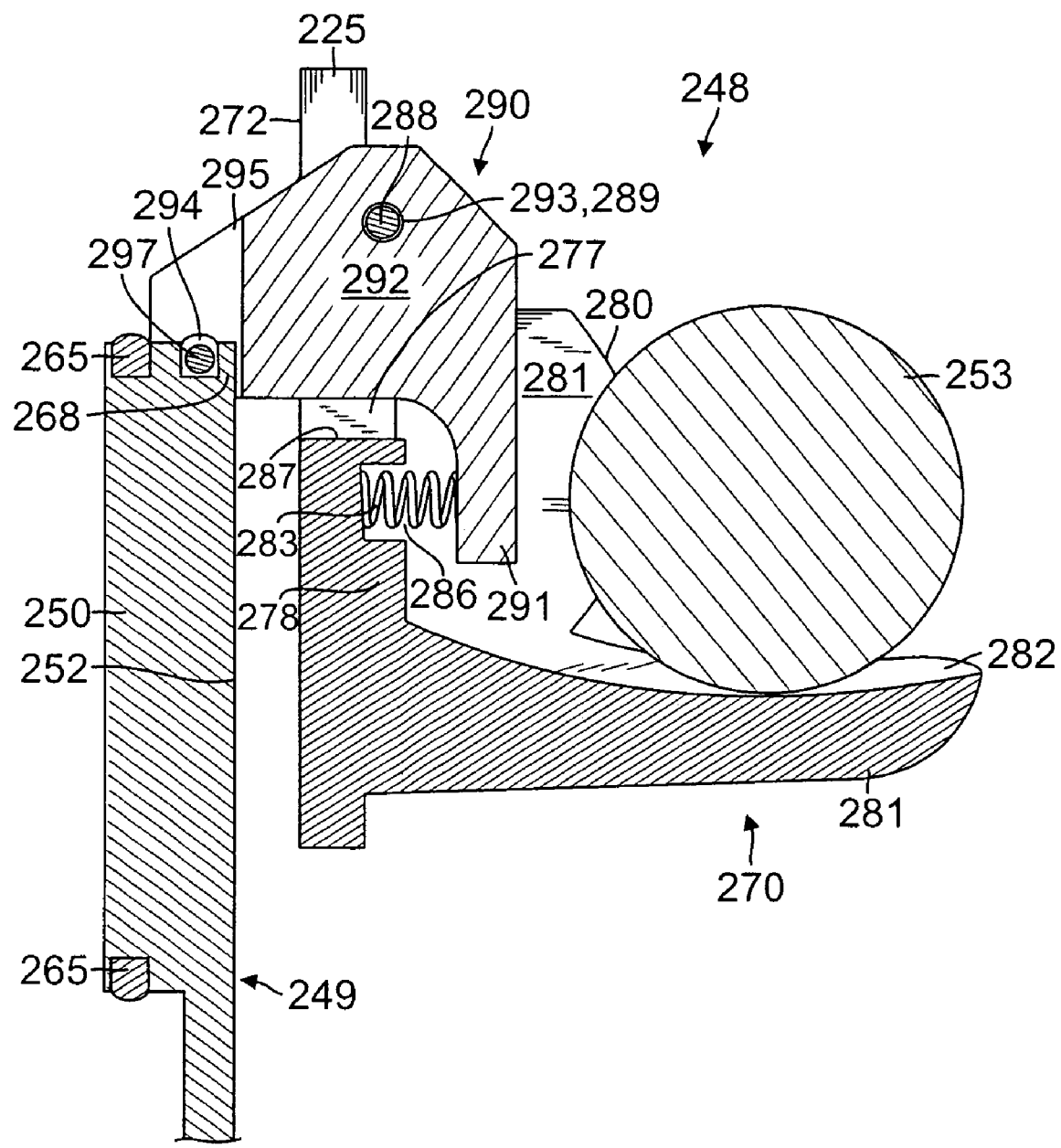
FIG. 6 is a cross-section view to illustrate vertical shock and vibration force triggering mechanism of the present invention.
Figure 10:
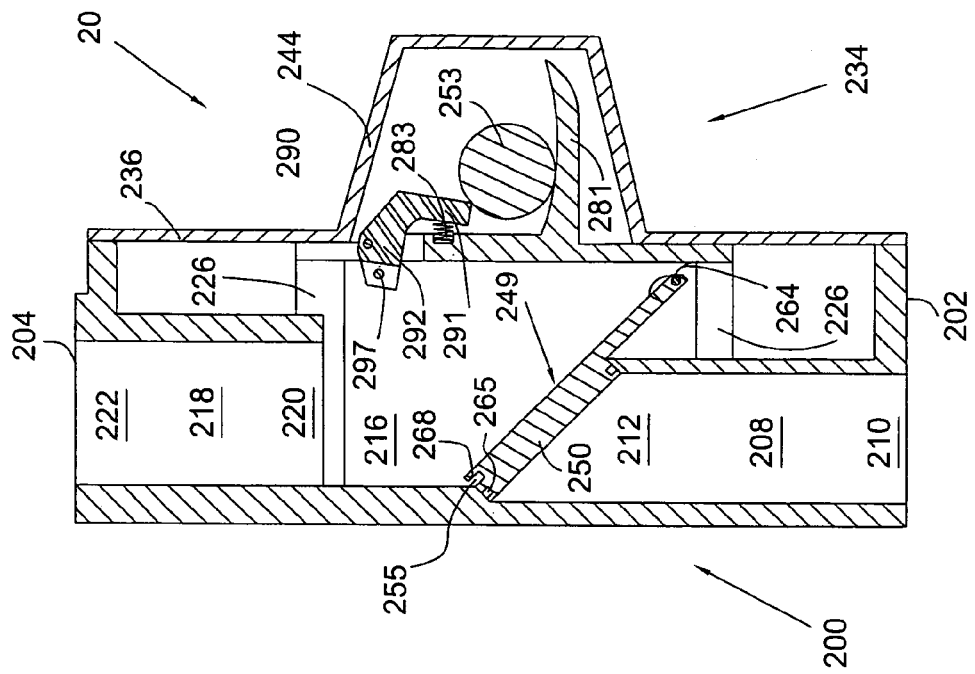
FIG. 10 is a cross-sectional view of the present invention vertical shock and vibration force responsive valve assembly, wherein a vertical shock and vibration force triggering mechanism is illustrated at the non-actuated status to thereby allow a fluid flow through the valve assembly.

The vertical shock and vibration force triggering mechanism 248, which is better illustrated in FIG. 6, is sealed inside of the housing and consists of the first and second body. Referring to FIGS. 5, 6 and 10, there is illustrated the assembly which is comprised of a valve stopper 249, a cradle 270 which is affixed to a longitudinal plate 272, a ball 253 which serves as a shock and vibrational force receiving means, and a bent swing member 290 having a downward arm 291 and transverse section 292 which is rotatably assembled to the cradle.

The valve stopper 249 is comprised of a circular disc 250 which serves as a cover of the first fluid channel 208 to stop the fluid flow. The disc on the right side surface is affixed with a connecting member 252. The connecting member is generally a "Y" or "U" shaped structure including an elongated rectangular section 254 having an opened end simultaneously connected to an identical first and second arm 256a and 256b. The arms are connected to be symmetric relative to an axis which is aligned with a middle of the elongated rectangular section 254 of the connecting member 252. In addition, an upward extension 268 is positioned at the opened end and is aligned with the symmetric axis of the connecting member 252, which constructs a space 255 between the upward extension 268 and the circumference of the disc 250. It will be appreciated that the upward extension 268 serves as a latch arm of the latch of the vertical triggering mechanism.

As further illustrated in FIG. 5, a longitudinal right side 260a of the first arm 256a extends to a descending right side 262a which ends at an opened bottom end 258a. The descending right side 262a is preferably at an angle of approximately 135 degrees clockwise and connects to the longitudinal side 260a. It will be appreciated that the longitudinal and descending right side 260a and 262a can be painted with different colors. For example, the longitudinal side 260a is a green color and the descending side 262a is a red color. In addition, an opening is positioned adjacent the opened end 258a of the first arm. The opening is orientated in parallel with the right side 260a and perpendicular to the symmetric axis of the connecting member 252. Similarly, a longitudinal right side 260b of the second rear arm 256b extends to a descending right side 262b which ends at an opened bottom end 258b, wherein two sides are painted in different colors. In addition, an opening is positioned adjacent the opened end 258b, which is orientated in parallel with the right side 260b and perpendicular to the symmetric axis of the connecting member 252.

A transverse axle 266 having a first and second end penetrates through the openings of the respective first and second arm 256a and 256b, and further penetrate through a spring 264 which is positioned between two arms of the valve stopper, wherein one end of the spring is positioned on the right side of the rectangular section 254.

It will be appreciated that the valve stopper 246 is rotatable around an axis which is aligned with the openings 230 and 232 of the first body 200, after the stopper 249 is assembled into the first body 200 from connecting the transverse axle 266 to the respective first and second axle opening 230 and 232 of the first body. As further illustrated, a first narrow slot 266a is positioned at the first end of the axle 166, which is transverse to an elongated direction of the axle. Similarly, a second narrow slot 266b is positioned at the second end of the axle. Therefore, the valve stopper 247 rotates as the axle 266 rotates which is driven by a rotating force applied to one of the slots, such as the force of a screw drive.

Referring to FIGS. 5, 6 and 10, there is illustrated the cradle 270, which is connected to the left side of the longitudinal plate 272. The plate 272 is generally rectangular including a front and rear side, a transverse first and second side 273 and 274. Within the plate, there is a central downward slot 275 including an opened top end which starts at the second transverse side 274 of the plate to extend downwardly to an end of a central slot 277 of the cradle. Since the cradle 270 is affixed to the left side plate 272, the downward slot 275 is connected to the central slot 277 in the a direction extending to the right to form a common end 287 of the slots 275 and 277. In addition, a plurality of openings 276 are positioned onto the respective corners of the rectangular plate for affixing the cradle 270 to the first body 200 of the housing.

The cradle 270 is generally a seat shaped structure, comprising a longitudinal wall 278 as a seat back and a transverse round disc 279 as a seat. The longitudinal wall 278 includes a top side 271, a front side having an arcuate extension 279 in the rightward orientation, a rear side having an arcuate extension 280 in the rightward orientation, and a right concave exterior side 281 which is a part of a upward cylindrical surface 281. In addition, a transverse slot 289 is positioned adjacent and below the top 271. The slot 289 is a housing of a transverse axle 288 which serves as a rotating axis of a bent swing member 290. The longitudinal wall 278 is connected to the right side of the transverse round disc 279 having a concave top side 280, so that the right side concave cylindrical surface 281 connects a part of the circumference of the disc round concave top side 280, wherein a projection of the center of the round transverse disc 279 is positioned on the central axis of the plate 272.

Referring to FIG. 6 illustrates a cross section of the vertical shock and vibration triggering mechanism 248. The downward slot 275 is illustrated to position through an upper part of the plate 272 and align with the plate central symmetric axis. A round transverse indentation 282 is positioned adjacent but below the common end 287 of the slots 275 and 277, whose projection is also positioned on the symmetric axis of the plate 272. A transverse spring 283 at one end is positioned inside of the indentation 281 and at the opposite end is connected to a left side of a downward arm 291 of the bent swing member 290.

As illustrated, the bent swing member 290 is comprised of the downward arm 291 having an opened end, wherein the downward arm 291 at its opposite end is connected to a transverse section 292 at an angle, preferably about 90 degrees. The transverse section 292 at its opposite opened side is comprised of a upward slot 295, where a transverse opening 294 penetrates through a position adjacent the opposite side of the transverse section 292, and further penetrates through the upward slot 295. A transverse rod 297 penetrates through the opening 294, which serves as a latch pin of a latch of the vertical triggering mechanism 248. In addition, as illustrated in FIG. 6, an opening 293 is positioned at a top of the transverse section 292 of the swing member 290. Therefore, after the transverse section 292 of the bent swing member 290 is positioned to cross the upward slots 275 and 277, and the axle 288 penetrates through the opening 293 of the bent swing arm 290 and is further installed inside of the transverse slot 277 of the cradle, the swing member 290 having the down arm 291 and transverse section 292 rotates around the axle 288, which is further illustrated in FIGS. 10 and 11.

The vertical shock and vibration force responsive valve assembly 20 is assembled after installation of the vertical shock and vibration force triggering mechanism 248 including the ball 253 onto the first body 200 of the housing. The longitudinal left side plate 272 of the mechanism 248 is fastened to the right sides of the rightward supports 226 of the first body 200. The upward extension 268 of the valve stopper 249 is positioned to contact the transverse rod 297 so that the rod 297 of the bent swing member 290 occupies the space 255 of the valve stopper 249, wherein the extension 268 and the transverse rod 297 serves as the respective latch arm and pin of the latch which is in a locking condition. In addition, the opposite end of the spring 264 is positioned on the left side of the longitudinal plate 272. The assembly 20 is completed after affixation of the second body 234 to the first body 200 of the housing in an air tight fashion.

Therefore, referring to the setting as illustrated in FIG. 10, the bent swing member 290 serves as a leverage where the downward arm 291 is a first leverage arm and the transverse section 292 is a second leverage arm, where the leverage of the bent swing member 290 is balanced since a rightward force of the spring 286 which is applied to the downward arm 291 balances a leftward force of the spring 264 which is applied to the transverse arm 292 through the transverse rod 297. Therefore, the valve stopper 249 is longitudinally positioned in a stable condition.

Figure 11:
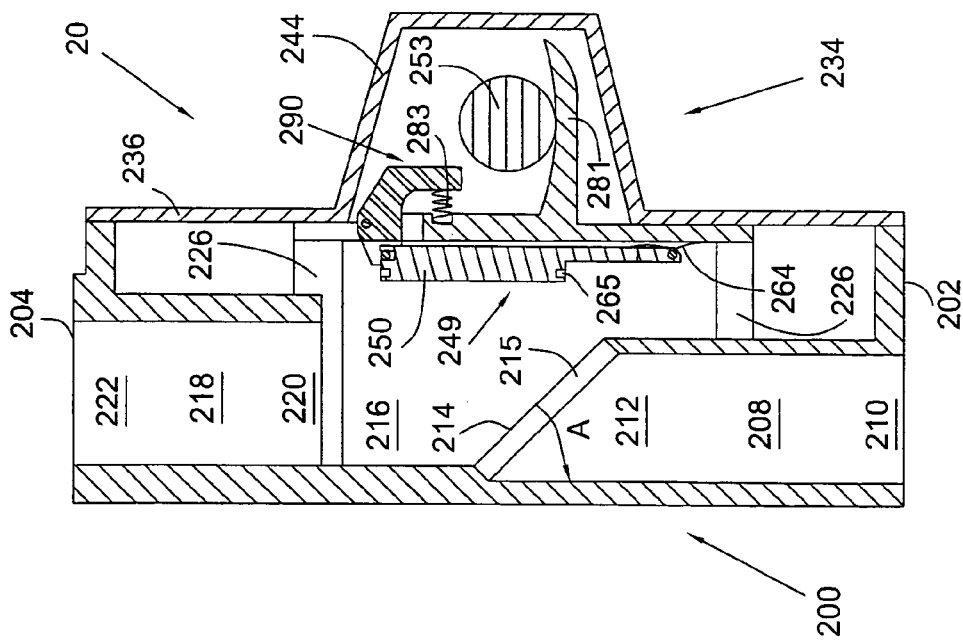
FIG. 11 is a cross-sectional view of the present invention vertical shock and vibration force responsive valve assembly, where the vertical shock and vibration force triggering mechanism is at the actuated status to thereby close the fluid flow after responding to the shock and vibration forces of a predetermined magnitude.

Referring to FIGS. 10 and 11, there is illustrated how the present invention vertical shock and vibration force responsive valve assembly 20 appropriately responds shock and vibration movement generated by earthquake to close a flow of a fluid such as a natural gas flow for safety. As illustrated in FIG. 10, the assembly 20 is at the non-actuated state, wherein the valve stopper 249 is locked by the bent swing member 290, which results in that the first fluid channel 208 is open so that a fluid can flow from the first end 210 of the first fluid channel 208 to the second end 222 of the second fluid channel 218, wherein the first and second fluid channels 208 and 222 are connected to the respective fluid conduits.

It will be appreciated that, through the transparent window 246 of the second body 234, the green color of the top transverse side 260a of the first transverse elongated member 256a is visible, wherein the visible green color indicates the non actuated status of the present invention vertical shock and vibration force responsive valve assembly 20.

As illustrated in FIG. 10, according to the non-actuated status the ball 253 which serves as the shock and vibration force receiving means is spontaneously placed at the center of the transverse concave surface 280 of the cradle 270, which is surrounded by the upward circular surface 281 of the wall 277 having the front and rear side rightward arcuate extension 279 and 280 and the rightward cup 244 of the second body 234. It will be appreciated that the center of the concave surface 280 is the lowest position so that the ball 253, which is positioned physically stable, is away from the downward arm 291 of the bent swing member 290.

However, during earthquake, a vibration movement of the earth causes movement of the ball 253. It will be appreciated that, the vertical triggering mechanism 248 of the present invention is designed in such way that the ball 253 in movement will not get stuck since the ball 253 is only restricted to move on the top concave surface 282 of the cradle 270. Therefore, the ball will always ricochet back towards the center after it ricochets away from the center of the interior concave side 282.

In this situation, the movement of the ball 253 permits it to hit against the downward arm 291 to thereby cause a leftward rotating movement of the downward arm 291. Thus, it also activates the triggering mechanism 248 as illustrated in FIG. 11, where the leftward movement of the downward arm 291 causes an upward rotating movement of the transverse arm 292 including the upward rotating movement of the transverse rod 297. This results in releasing of the locking condition of the latch constructed by the upward extension 268 of the valve stopper 249 and the transverse rod 297 of the bent swing member 290.

After releasing of the locking condition of the latch structure, the valve stopper 249 which is applied by the forces of the spring 264 and subsequently a force of the weight of the stopper rotates, preferably about 45 degrees in the counterclockwise direction, to position into the annular seat 215 of the second end 212 of the first fluid channel 208, wherein the size of the annular seat 215 matches the round disc 250 of the valve stopper 249. Furthermore, the round disc 250 of the valve stopper 249 remains inside of the seat 215, since it is constantly under the spring forces in the clockwise direction to balance forces of the fluid under a supplied pressure. Therefore, the round disc 250 closes the first fluid channel 208 so that a flow of the fluid such as a natural gas flow is stopped. It will be appreciated that an "O" ring 265 can be positioned on the circumference of the round disc 250 for achieving the air tight seal. In this situation, it will be appreciated that, through the transparent window 246, the red color of the descending side 262a of the valve stopper 249 is visible after it rotates about 45 degrees, wherein appearance of the red color indicates an actuated status of the valve assembly 20.

It will be appreciated that a specific object of the present invention to add the transverse spring 286 which is connected to the respective cylindrical wall 277 and the left side of the downward arm 291 of the cradle 270 is to prevent unnecessary activation of the triggering mechanism 248 which can stop the fluid flow during a weak earthquake whose shock and vibration in small magnitudes and does not cause a safety concern. In such situation when the weak earthquake happens, the ball 253 which is energized by the earthquake hits leftward against the downward arm 291. However, the downward arm does not move since it is supported by the rightward spring forces of the spring 283 to thereby avoid activation of the triggering mechanism 248. With addition of the spring 283, it will be appreciated that the triggering mechanism 248 of the present invention responsive valve assembly 20 will not be activated if an earthquake happens which frequencies are under 0.15 giga Hertz.

The present invention valve assembly 20 can be deactivated after being activated, wherein the rotatable axle 294 is turned clockwise by an external force such as the force of a screwdriver until the upward extension 268 of the valve stopper 249 attaches the transverse rod 297 of the bent swing member 290, so that the rod 297 re-occupies the space 255 of the valve stopper 249 to return to the locking condition of the latch. In this setting, the green color of the top transverse elongated side 260a of the valve stopper is visible through the transparent window 246 to indicate completion of the deactivation of the valve assembly 20.

The above disclosure illustrates one embodiment of the present invention vertical valve assembly 10. However, various embodiments are readily available with variations of structural components. For example of another embodiment, the spring 264 which is positioned between the first and second arm 256a and 256b as illustrated in FIG. 2 can be eliminated, According to this structural variation, the fluid flow can be arranged in a direction which is from the second end 222 of the second fluid channel 218 to the first end 220 of the first fluid channel 208. Therefore, the flow direction is in reverse, as compared with the above disclosed one.

The embodiment works so that as soon as the locking status is released, then a force of the fluid flow will push the valve stopper 249 which rotated in the clockwise direction to speed up to the seat 215 of the first fluid channel 208. The round disc 250 of the valve stopper will remain inside of the seat in the air-tight fashion when the valve stopper 249 is continuously under the forces of the fluid, so that the flow of the fluid through the assembly 20 is stopped.

An advantage of eliminating the spring 264 and reversing the fluid flow direction is a reduction of the structural elements in addition to ease of deactivating the assembly 20 after the vertical triggering mechanism 248 is activated.

In addition, the bent swing member 290 can be a form of a leverage, where a first arm of the leverage can be struck by the ball 253 as the shock and vibration force receiving means, and a second arm of the leverage contains a latch member, which can be locked or released by another latch member of the valve stopper 249. The valve stopper can be comprised of a stopper, instead of the specific round disc 253, to stop the interior end 212 of the first fluid channel 208. The cradle 270 is not limited to have the cylindrical wall having the respective front and rear side arcuate extension. Instead, it can be comprised of an upward wall as long as the downward slot 277 can be positioned, since the ball is always surrounded by the central rightward cup 244 of the right side body 234 of the assembly housing so that the movement of the ball will be restricted within an interior of the cup. In general, the cradle can be in any form as long as it can receive the ball. As to the ball 253, it can be replaced with a weighed object which is rotatable and movable. Therefore, under an excitation of the earthquake the weight object will strike the leverage to cause to close off flow of the fluid.

The horizontal and vertical shock and vibration force responsive valve assembly 10 and 20 can be made with durable metals or metal alloys such as a steel, except for the transparence glass windows of 146 and 246, in addition to the rubber "O" rings.

Defined in detail, the present invention is a horizontal shock actuated valve assembly adapted to automatically close off a controlled fluid through a conduit in response to a shock and vibration force of a predetermined magnitude and having a horizontal shock and vibration force triggering mechanism comprising: (a) a valve stopper comprising a circular disc which on a top surface is affixed with a connecting member, the connecting member includes an elongated rectangular section having an opened end simultaneously connected to an identical first and second arm, a forward extension is positioned at the opened end, a top elongated transverse side of the first arm extends to a descending top side ending at an opened end, a top elongated transverse side of the second arm extends to a descending top side which ends at an opened end, a transverse axle penetrates through the opened ends of the respective first and second arm; (b) a cradle which is affixed to a transverse plate having a central slot, the cradle is comprised of a circular wall having an interior upward cylindrical surface, which is connected to a concave transverse interior side, an upward slot crosses the wall whose projection is positioned on the central slot of the plate, the upward slot at a bottom end is connected to a transverse slot positioned on a bottom side of the cradle which is combined vertically with the central slot of the plate, the transverse interior concave side comprising a central circular concave recess which is circumferentially spaced by a multiplicity of identical concave quadrants; (c) a bent swing member comprising a first upward arm having an opened end, which at an opposite end is connected to a second transverse arm, the second transverse arm at an opposite opened end is comprised of a transverse rod; (d) a ball; (e) a housing of the assembly comprising an upper body and a lower body which are affixed in an air-tight fashion, the lower body being a rectangular shape, a first and second fluid channel are positioned within the lower body, the first fluid channel includes a first and second end, wherein the first end of the first fluid channel penetrates through the lower body, the second end of the first fluid channel which is positioned inside of the lower body comprising a descending outer surface and an inner circular seat, the second fluid channel comprising a first end which is positioned inside of the lower body, and a second end which penetrates through the lower body, the upper body which matches the shape of the lower body comprising a central cup which at a lower circumference is connected to a transverse rectangular plate which includes a transparent window; and (f) the valve stopper is rotatably connected to the lower body, wherein the forward extension is locked by the transverse rod of the bent swing member which can swing within the slots of the cradle, the plate affixed with the cradle is affixed to the lower body, the ball is retained on the transverse concave side of the cradle by the housing cup and the circular wall of the cradle and after a force of a given magnitude the ball is caused to strike and rattles around and ricochets off the interior of the housing cup, the ball thereby strikes the upward arm of the bent swing member to cause the transverse rod to release the forward extension of the valve stopper which further causes the round disc of the valve stopper to move against the seat of the first fluid channel and thereby activate the horizontal assembly to stop the flow of the fluid therethrough.

Defined broadly, the present invention is a horizontal shock actuated valve assembly adapted to automatically close off a controlled fluid through a conduit in response to a shock and vibration force of a predetermined magnitude and having a horizontal shock and vibration force triggering mechanism comprising: (a) a valve stopper comprising a stopper on a top surface which is affixed with a connecting member, the connecting member includes a forward extension at one end which serves as a latch arm and a descending top side which ends at an opposite end, wherein a transverse top side extends from the forward extension to the descending side; (b) a cradle which is affixed to a transverse plate having a central slot, the cradle is comprised of an interior upward cylindrical surface, which is connected to a concave transverse interior side, an upward slot crosses the upward surface whose projection is positioned on the central slot of the plate, the upward slot at a bottom end is connected to a transverse slot positioned on a bottom side of the cradle which is combined vertically with the central slot of the plate; (c) a bent swing member which serves as a leverage comprising a first upward arm having an opened end, which at an opposite end is connected to a second transverse arm, the second transverse arm at an opposite opened end is comprised of a transverse rod which serves as a latch pin; (d) a weight which serves as a shock and vibration force receiving means; (e) a housing of the assembly comprising an upper body and a lower body, the interior of the lower body includes a first and second fluid channel, the first fluid channel includes a first end to penetrate through the lower body and a second interior end, the second fluid channel comprising a first interior end and a second exterior end, the upper body comprising a central cup and a transparent window; and (f) the valve stopper is rotatably connected to the lower body, wherein the forward extension is locked by the transverse rod of the bent swing member which can swing within the slots of the cradle, the plate affixed with the cradle is affixed to the lower body, the weight is retained on the transverse concave side of the cradle by the housing cup and the upward surface of the cradle and after a force of a given magnitude the weight is caused to rattle around and ricochets off the interior of the housing cup, the weight thereby strikes the upward arm of the bent swing member to cause the forward extension to release the transverse rod of the bent swing member, which further causes the stopper of the valve stopper to move against the interior end of the first fluid channel and thereby activate the horizontal assembly to stop the flow of the fluid therethrough.

Defined even more broadly, the present invention is a horizontal shock actuated valve assembly having a valve housing and a horizontal shock and vibration force triggering mechanism comprising: (a) a valve stopper comprising a stopper on a top surface which is affixed with a connecting member, the connecting member includes a latch member at one end and a descending top side which ends at an opposite end, wherein a transverse top side extends from the forward extension to the descending side; (b) a weight receiving means which is affixed to a transverse plate having a central slot, the weight receiving means is comprised of an interior upward surface, which is connected to a concave transverse interior side, an upward slot crosses the upward surface whose projection is positioned on the central slot of the plate, the upward slot at a bottom end is connected to a transverse slot positioned on a bottom side of the cradle which is combined vertically with the central slot of the plate; (c) a leverage comprising a first arm which is connected at an end of a second arm, the second arm at an opposite end is comprised of another latch member; (d) a weight which serves as a shock and vibration force receiving means; (e) a housing of the assembly comprising an upper body and a lower body having an interior lower body, the interior of the channel includes a first and second fluid channel, which each is comprised of a respective interior end, the upper body comprising a central cup and a transparent window; and (f) the valve stopper is rotatably connected to the lower body, wherein the latch member is locked by the another latch member of the leverage which can swing within the slots of the weight receiving means, the plate is affixed to the lower body, the weight rests on the transverse concave side of the weight receiving means by the housing cup and the upward surface and after a force of a given magnitude the weight is caused to hit the weight receiving means rattles around and ricochets off the interior of the housing cup, the weight thereby strikes the first arm of the leverage to cause the latch member to release the another latch member of the leverage, which further causes the stopper of the valve stopper to move against the interior end of the first fluid channel and thereby activate the horizontal assembly to stop the flow of the fluid therethrough.

Defined even more broadly, the present invention is a vertical shock actuated valve assembly adapted to automatically close off a controlled fluid through a conduit in response to a shock and vibration force of a predetermined magnitude and having a vertical shock and vibration force triggering mechanism comprising: (a) a valve stopper comprising a circular disc which on a right side is affixed with a connecting member, the connecting member includes an elongated rectangular section having an opened end simultaneously connected to an identical first and second downward arm, an upward extension is positioned at the rectangular section opened end, an elongated right side of the respective first and second arm extends to a respective descending right side which ends at a respective opened end; (b) a cradle which is affixed to a longitudinal plate having a central downward slot, the cradle is comprised of a longitudinal wall having an exterior concave cylindrical surface which is attached with a respective front and rear side arcuate rightward extension, wherein the exterior surface at a bottom is connected to a transverse disc having a concave top side, a downward slot which crosses the wall is combined with the central downward slot of the plate to form a common end, an indentation is positioned below the common end wherein a transverse spring is positioned; (c) a bent swing member comprising a first downward arm having an opened end, wherein a left side of the opened end is connected to the transverse spring, the first downward arm at an opposite end is connected to a second transverse section, the second transverse section at an opposite opened end is comprised of a longitudinal slot which is penetrated by a transverse rod; (d) a ball; (e) a housing of the assembly comprising a first and second body which are affixed in an air-tight fashion, the first body being a rectangular shape and positioned longitudinally, a first and second longitudinal fluid channel are positioned within the first body, the first fluid channel includes a first and second end, wherein the first end of the first fluid channel penetrates through the first body, the second end of the first fluid channel which is positioned inside of the first body comprising a descending outer surface and an inner circular seat, the second fluid channel comprising a first end which is positioned inside of the first body, and a second end which penetrates through the first body, the second body which matches the shape of the first body comprising a central leftward cup which at a left circumference is connected to a transverse rectangular plate having a transparent window; and (f) the valve stopper is rotatably connected to the first body, wherein the upward extension is locked by the transverse rod of the transverse section which crosses the downward slots so that the swing member is enabled to swing, the plate affixed with the cradle is affixed to the first body, the ball is retained on the transverse concave side of the cradle surrounded by the housing leftward cup and the concave longitudinal surface and after a force of a given magnitude the ball is forced to rattles around and ricochet off an interior of the housing cup, the ball thereby strikes the downward arm of the bent swing member to cause the transverse rod to release the forward extension of the valve stopper which further causes the round disc of the valve stopper to move against the seat of the first fluid channel and thereby activate the vertical assembly to stop flow of the fluid therethrough.

Defined even more broadly, the present invention is a vertical shock actuated valve assembly adapted to automatically close off a controlled fluid through a conduit in response to a shock and vibration force of a predetermined magnitude and having a vertical shock and vibration force triggering mechanism comprising: (a) a valve stopper comprising a stopper which on a right side is affixed with a connecting member, the connecting member includes an upward extension which serves as a latch arm and a descending right side which ends at an opened end, wherein an exterior right side extends from the upward extension to the descending side; (b) a cradle which is affixed to a longitudinal plate having a central downward slot, the cradle is comprised of a longitudinal wall having an exterior concave cylindrical surface, the exterior surface at a bottom is connected to a transverse disc having a concave top side, a downward slot which crosses the wall is combined with the central downward slot of the plate to form a common end, an indentation is positioned below the common end wherein a transverse spring is positioned; (c) a bent swing member which serves as a leverage comprising a first downward arm having an opened end, wherein a left side of the opened end is connected to the transverse spring, the first downward arm at an opposite end is connected to a second transverse section comprising a transverse rod which serves as a latch pin; (d) a weight which serves as a shock and vibration force receiving means; (e) a housing of the assembly comprising a first and second body which are affixed together, the first body having an interior comprising a first and second longitudinal fluid channel, the first fluid channel includes a first end which penetrates through the first body, and a second interior end, the second fluid channel comprising a first interior end and a second exterior end, the second body comprising a central leftward cup and a transparent window; and (f) the valve stopper is rotatably connected to the first body, wherein the upward extension is locked by the transverse rod of the transverse section which rotatably crosses the downward slots, the plate affixed with the cradle is affixed to the first body, the weight is retained on the transverse concave side of the cradle surrounded by the housing leftward cup and the concave longitudinal surface and a force of a given magnitude, the weight rattles around and ricochets off an interior of the housing cup, the weight thereby strikes the downward arm of the bent swing member to cause the transverse rod to release the forward extension of the valve stopper which further causes the round disc of the valve stopper to move against the interior end of the first fluid channel and thereby activate the vertical assembly to stop flow of the fluid therethrough.

Defined even more broadly, the present invention is a vertical shock actuated valve assembly having a valve housing and a vertical shock and vibration force triggering mechanism comprising: (a) a valve stopper comprising a stopper which on a right side is affixed with a connecting member, the connecting member includes a latch member and a descending right side which ends at an opened end, wherein an exterior right side extends from the latch member to the descending side; (b) a weight receiving means which is affixed to a longitudinal plate having a central downward slot, the weight receiving means is comprised of an exterior concave cylindrical surface which at a bottom is connected to a concave top side, a downward slot which crosses the exterior surface is combined with the central downward slot of the plate to form a common end; (c) a leverage comprising a first arm which is connected to a second section, the second section is comprised of another latch member; (d) a weight which serves as a shock and vibration force receiving means; (e) a housing of the assembly comprising a first and second body which are affixed together, an interior of the first body comprising a first and second longitudinal fluid channel, each fluid channel is comprised of a respective interior end, the second body comprising a central leftward cup and a transparent window; and (f) the valve stopper is rotatably connected to the first body, wherein the latch member is locked by the another latch member of the transverse section of the leverage which rotatably crosses the downward slots, the plate affixed with the weight receiving means is affixed to the first body, the weight is retained on the transverse concave side surrounded by the housing leftward cup and the concave longitudinal exterior surface and when a force of a given magnitude is applied, the weight rattles around and ricochets off an interior of the housing cup, the weight thereby strikes the first arm of the leverage to cause the another latch member to release the latch member of the valve stopper which further causes the stopper of the valve stopper to move against the interior end of the first fluid channel and thereby activate the vertical assembly to stop flow of the fluid therethrough.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A horizontal shock actuated valve assembly adapted to automatically close off a controlled fluid through a conduit in response to a shock and vibration force of a predetermined magnitude and having a horizontal shock and vibration force triggering mechanism comprising:
   a. a valve stopper comprising a circular disc which on a top surface is affixed with a connecting member, said connecting member includes an elongated rectangular section having an opened end simultaneously connected to an identical first and second arm, a forward extension is positioned at said opened end, a top elongated transverse side of said first arm extends to a descending top side ending at an opened end, a top elongated transverse side of said second arm extends to a descending top side which ends at an opened end, a transverse axle penetrates through said opened ends of the respective first and second arm;
   b. a cradle which is affixed to a transverse plate having a central slot, said cradle is comprised of a circular wall having an interior upward cylindrical surface, which is connected to a concave transverse interior side, an upward slot crosses said wall whose projection is positioned on said central slot of said plate, said upward slot at a bottom end is connected to a transverse slot positioned on a bottom side of the cradle which is combined vertically with said central slot of the plate, said transverse interior concave side comprising a central circular concave recess which is circumferentially spaced by a multiplicity of identical concave quadrants;
   c. a bent swing member comprising a first upward arm having an opened end, which at an opposite end is connected to a second transverse arm, said second transverse arm at an opposite opened end is comprised of a transverse rod;
   d. a ball;
   e. a housing of said assembly comprising an upper body and a lower body which are affixed in an air-tight fashion, said lower body being a rectangular shape, a first and second fluid channel are positioned within the lower body, said first fluid channel includes a first and second end, wherein said first end of the first fluid channel penetrates through the lower body, said second end of the first fluid channel which is positioned inside of the lower body comprising a descending outer surface and an inner circular seat, said second fluid channel comprising a first end which is positioned inside of the lower body, and a second end which penetrates through the lower body, said upper body which matches said shape of the lower body comprising a central cup which at a lower circumference is connected to a transverse, rectangular plate which includes a transparent window; and
   f. said valve stopper is rotatably connected to said lower body, wherein said forward extension is locked by said transverse rod of said bent swing member which can swing within said slots of said cradle, said plate affixed with said cradle is affixed to said lower body, said ball is retained by said central circular concave recess, and after a force of a given magnitude said ball is caused to strike, rattle around and ricochet off an interior side of said cradle, the ball thereby strikes said first upward arm of the bent swing member to cause upward rotation of said second transverse arm, which causes the transverse rod to release the forward extension of the valve stopper which further causes said round disc of the valve stopper to move against said seat of said first fluid channel and thereby activate said horizontal assembly to stop the flow of the fluid therethrough.

2. The horizontal shock and vibration force triggering mechanism in accordance with claim 1, wherein said ball is made of steel.

3. The horizontal shock and vibration force triggering mechanism in accordance with claim 1, wherein said descending top side of said valve stopper is connected to said top elongated transverse side at approximately 135 degrees in the clockwise direction.

4. The horizontal shock and vibration force triggering mechanism in accordance with claim 3, wherein said descending top side is a red color and said top elongated transverse side is a green color so that a visualized color of said respective red and green through said transparent window indicates a respective off and on status of said controlled fluid.

5. The horizontal shock and vibration force triggering mechanism in accordance with claim 1, wherein said descending outer surface of said first fluid channel is oriented 45 degrees clockwise relative to an orientation of said first fluid channel.

6. The horizontal shock and vibration force triggering mechanism in accordance with claim 1, wherein each of said quadrants is arched by an angle between 20 and 30 degrees to extend ascendant from said central recess towards said upward interior surface of said circular wall.

7. The horizontal shock and vibration force triggering mechanism in accordance with claim 1, further comprising said quadrants are positioned on said concave transverse interior side according to a first embodiment, wherein an orientation of a joint between a first and second quadrant, which is aligned with an orientation of a joint between a third and fourth quadrant, is perpendicular to an orientation of said upward slot and is further aligned with a central symmetric axis of said transverse plate in the vertical direction.

8. The horizontal shock and vibration force triggering mechanism in accordance with claim 1, further comprising said quadrants are positioned on said concave transverse interior side according to a second embodiment, wherein a central axis of a first and third quadrant is transverse to said upward slot and is further aligned with a central symmetric axis of said transverse plate in the vertical direction.

9. The horizontal shock and vibration force triggering mechanism in accordance with claim 1, further comprising a spring which is positioned between said first and second arm is penetrated by an axle which penetrates through said respective opened end of the respective arms and connects to said lower body.

10. A horizontal shock actuated valve assembly adapted to automatically close off a controlled fluid through a conduit in response to a shock and vibration force of a predetermined magnitude and having a horizontal shock and vibration force triggering mechanism comprising:
   a. a valve stopper comprising a stopper on a top surface which is affixed with a connecting member, said connecting member includes a forward extension at one end which serves as a latch arm and a descending top side which ends at an opposite end, wherein a transverse top side extends from said forward extension to said descending side;
   b. a cradle which is affixed to a transverse plate having a central slot, said cradle is comprised of an interior upward cylindrical surface, which is connected to a concave transverse interior side, an upward slot crosses said upward surface whose projection is positioned on said central slot of said plate, said upward slot at a bottom end is connected to a transverse slot positioned on a bottom side of said cradle which is combined vertically with said central slot of the plate;
   c. a bent swing member which serves as a leverage comprising a first upward arm having an opened end, which at an opposite end is connected to a second transverse arm, said second transverse arm at an opposite opened end is comprised of a transverse rod which serves as a latch pin;
   d. a weight which serves as a shock and vibration force receiving means;
   e. a housing of the assembly comprising an upper body and a lower body, the interior of said lower body includes a first and second fluid channel, said first fluid channel includes a first end to penetrate through said lower body and a second interior end, said second fluid channel comprising a first interior end and a second exterior end, said upper body comprising a central cup and a transparent window; and
   f. said valve stopper is rotatably connected to said lower body, wherein said forward extension is locked by said transverse rod of said bent swing member which can swing within said slots of said cradle, said plate affixed with said cradle is affixed to said lower body, said weight is retained on said transverse concave side of said cradle by said housing cup and said upward surface of said cradle and after a force of a given magnitude said weight is caused to rattle around and ricochet off an interior side of said cradle, the weight thereby strikes said upward arm of said bent swing member to cause said forward extension to release said transverse rod of said bent swing member, which further causes said stopper of the valve stopper to move against said interior end of the first fluid channel and thereby activate said horizontal assembly to stop the flow of the fluid therethrough.

11. A horizontal shock actuated valve assembly having a valve housing and a horizontal shock and vibration force triggering mechanism comprising:
   a. a valve stopper comprising a stopper on a top surface which is affixed with a connecting member, said connecting member includes a latch member at one end and a descending top side which ends at an opposite end, wherein a transverse top side extends from said forward extension to said descending side;
   b. a weight receiving means which is affixed to a transverse plate having a central slot, said weight receiving means is comprised of an interior upward surface, which is connected to a concave transverse interior side, an upward slot crosses said upward surface whose projection is positioned on said central slot of said plate, said upward slot at a bottom end is connected to a transverse slot positioned on a bottom side of said weight receiving means which is combined vertically with said central slot of the plate;
   c. a leverage comprising a first arm which is connected at an end of a second arm, said second arm at an opposite end is comprised of another latch member;
   d. a weight which serves as a shock and vibration force receiving means;
   e. a housing of the assembly comprising an upper body and a lower body having an interior lower body, the interior of the channel includes a first and second fluid channel, which each is comprised of a respective interior end, said upper body comprising a central cup and a transparent window; and
   f. said valve stopper is rotatably connected to said lower body, wherein said latch member is locked by said another latch member of said leverage which can swing within said slots of said weight receiving means, said plate is affixed to said lower body, said weight rests on said transverse concave side of said weight receiving means, after a force of a given magnitude said weight is caused to hit said weight receiving means including rattling around and ricocheting off an interior side of said weight receiving means, the weight thereby strikes said first arm of the leverage to cause the latch member to release the another latch member of the leverage, which further causes said stopper of the valve stopper to move against said interior end of the first fluid channel and thereby activate said horizontal assembly to stop the flow of the fluid therethrough.

\* \* \* \* \*